(12) United States Patent
Akamatsu

(10) Patent No.: US 7,890,323 B2
(45) Date of Patent: Feb. 15, 2011

(54) DIGITAL FILTERING METHOD, DIGITAL FILTERING EQUIPMENT, DIGITAL FILTERING PROGRAM, AND RECORDING MEDIUM AND RECORDED DEVICE WHICH ARE READABLE ON COMPUTER

(75) Inventor: Norio Akamatsu, Tokushima (JP)

(73) Assignee: The University of Tokushima, Tokushima (JP)

( * ) Notice: Subject to any disclaimer, the term of this patent is extended or adjusted under 35 U.S.C. 154(b) by 1053 days.

(21) Appl. No.: 11/658,685

(22) PCT Filed: Jul. 20, 2005

(86) PCT No.: PCT/JP2005/013334

§ 371 (c)(1),
(2), (4) Date: Jan. 29, 2007

(87) PCT Pub. No.: WO2006/011405

PCT Pub. Date: Feb. 2, 2006

(65) Prior Publication Data

US 2009/0192794 A1 Jul. 30, 2009

(30) Foreign Application Priority Data

Jul. 28, 2004 (JP) ............................. 2004-220022

(51) Int. Cl.
*G10L 19/00* (2006.01)
(52) U.S. Cl. ...................................... 704/230; 704/222
(58) Field of Classification Search .................. 704/226, 704/270, 230, 222

See application file for complete search history.

(56) References Cited

U.S. PATENT DOCUMENTS 3,727,218 A * 4/1973 Cantwell et al. .............. 342/90

(Continued)

FOREIGN PATENT DOCUMENTS

JP 06-140856 5/1994

(Continued)

OTHER PUBLICATIONS

Yuuki Yazama et al., "Vowel Recognition System for Mobile Interface by Using Discrete Voronoi Diagram and Statistical Process", The Institute of Electronics, Information and Communication Engineers Gijutsu Kenkyu Hokoku, Jul. 2, 2004, vol. 104, No. 169, pp. 1 to 6, Japan.

*Primary Examiner* — Abul Azad
(74) *Attorney, Agent, or Firm* — Ditthavong Mori & Steiner, P.C.

(57) ABSTRACT

Included in the digital filtering equipment for extracting a feature quantity from a speech signal in order to execute a speech recognition based on an inputted speech signal are: a) an waveform determining section for obtaining an inputted speech signal and quantizing the speech signal waveform; b) a division value operating section for summing a quantized signal data in a prescribed adjoining region to divide the summation value by the number of summed data, with respect to a data quantized at each point by the waveform determining section, whereby a division value is obtained with the data being centered; c) a comparison section for comparing a division value calculated by the division value operating section and the quantized data calculated in the division value operating section to output logical truth of a comparison result, with respect to each data; and d) a conversion section for converting the quantized data into the selected data points based on an output from the comparison section. Thus, the feature quantity can be extracted only by applying an integer summation and comparison operation, so that performance of arithmetic operation is extremely simplified to be fast and inexpensive.

26 Claims, 18 Drawing Sheets

U.S. PATENT DOCUMENTS

| | | | |
|---|---|---|---|
| 4,028,496 A | 6/1977 | LaMarche et al. | |
| 6,664,913 B1 * | 12/2003 | Craven et al. | 341/200 |
| 6,889,186 B1 | 5/2005 | Michaelis | |
| 2002/0007270 A1 | 1/2002 | Murashima | |
| 2003/0055634 A1 | 3/2003 | Hidaka et al. | |
| 2006/0239387 A1 * | 10/2006 | Orihashi et al. | 375/345 |

FOREIGN PATENT DOCUMENTS

| | | |
|---|---|---|
| JP | 2000-152394 | 5/2000 |
| JP | 2001-350488 | 12/2001 |
| JP | 2002-014689 | 1/2002 |
| JP | 2003-271190 | 9/2003 |
| JP | 2003-316378 | 11/2003 |
| JP | 2005/013334 | 8/2005 |
| WO | WO 03/044978 | 5/2003 |
| WO | PCT/JP2005/013334 | 4/2007 |

* cited by examiner

FIG.1
(a)
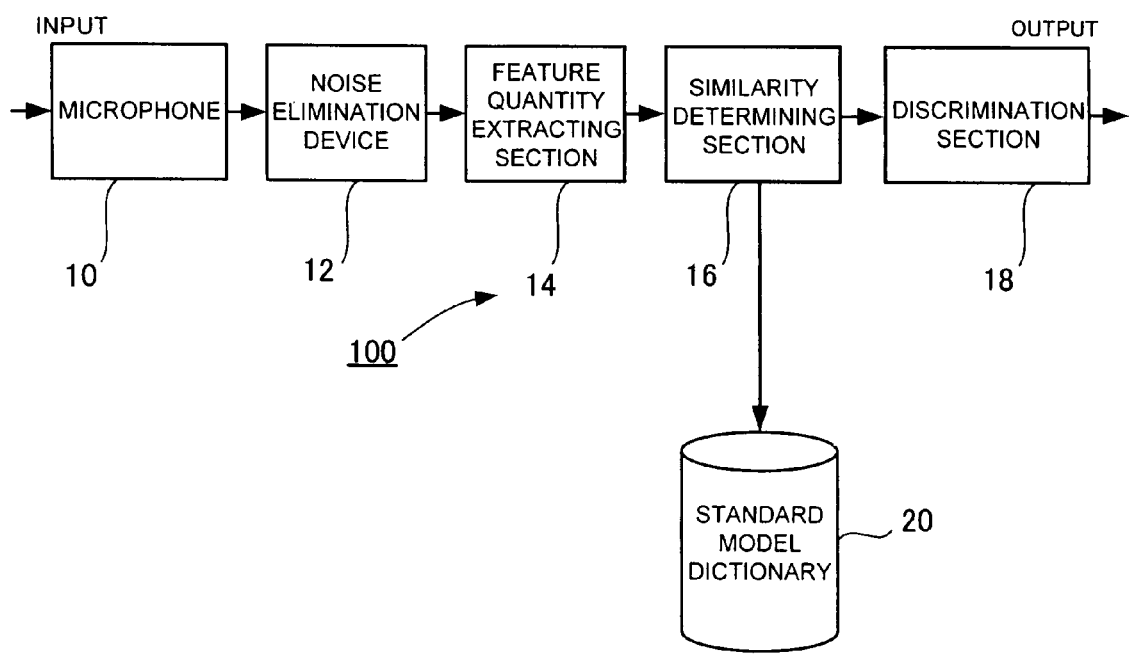
(b)
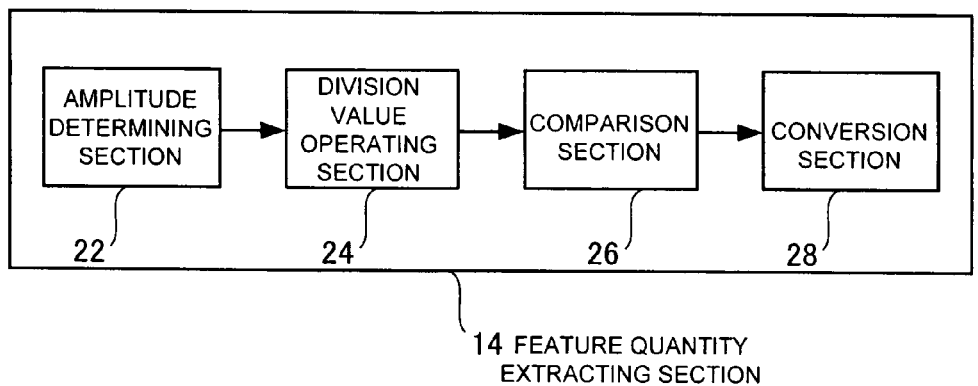

FIG.2
(a)
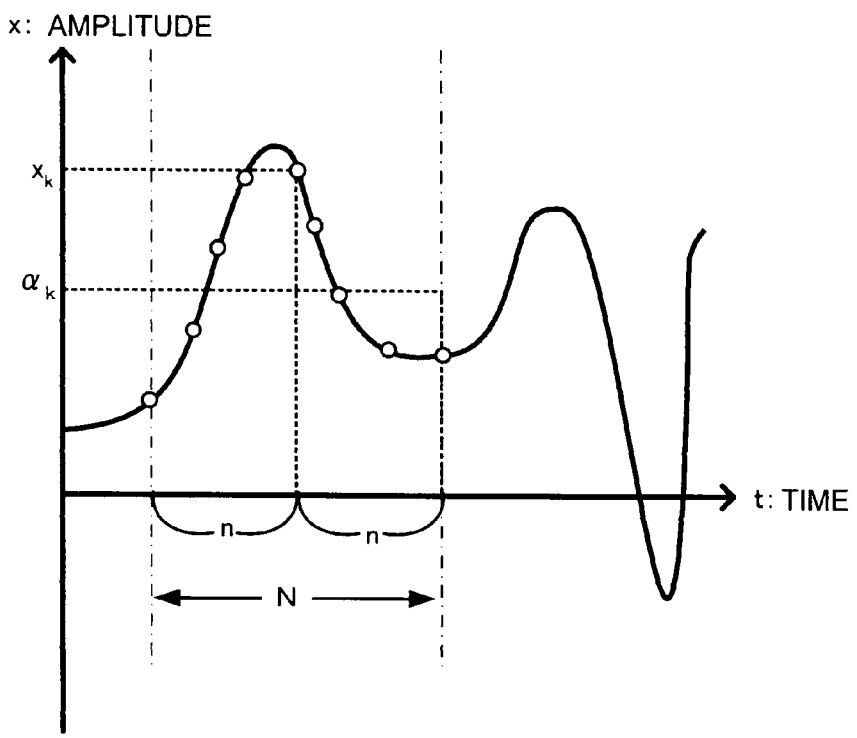
(b)
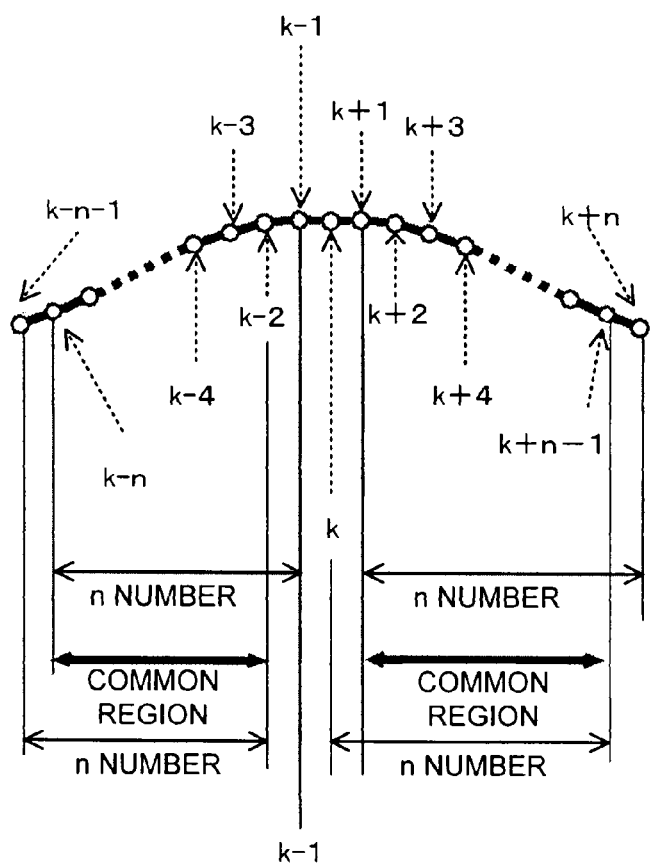

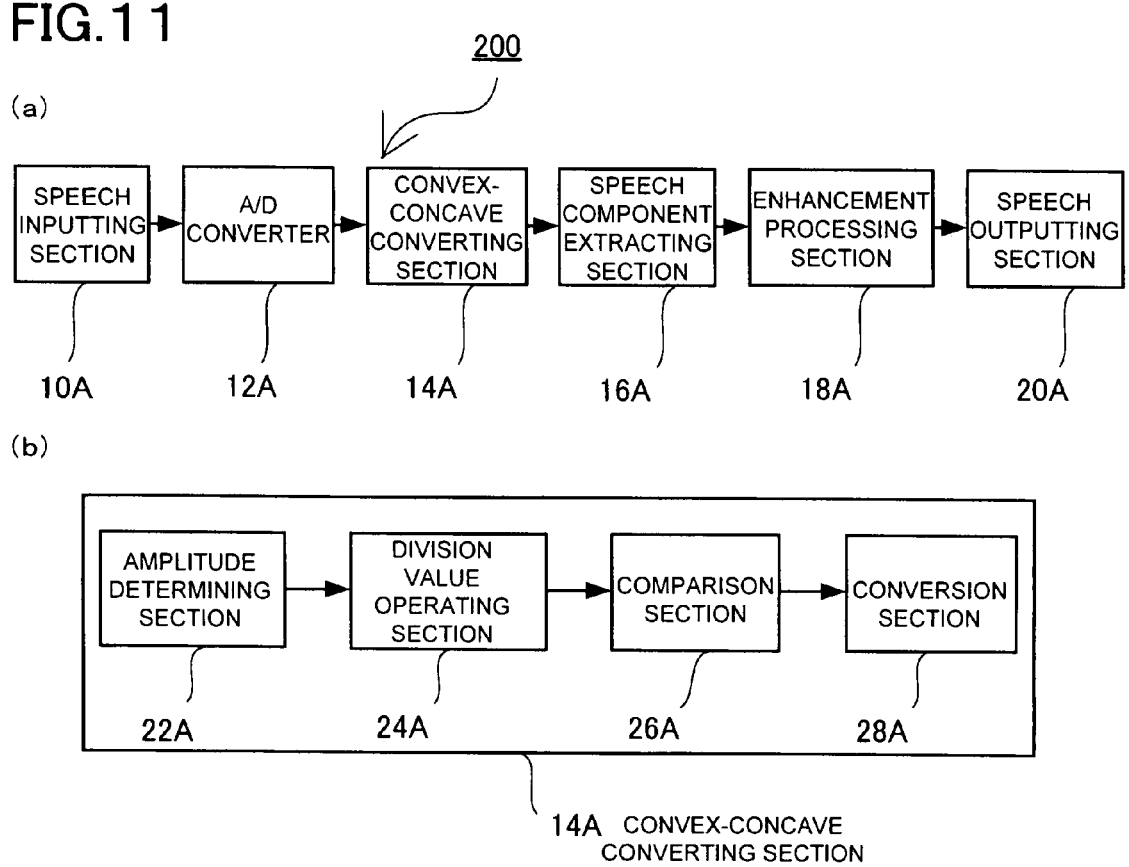
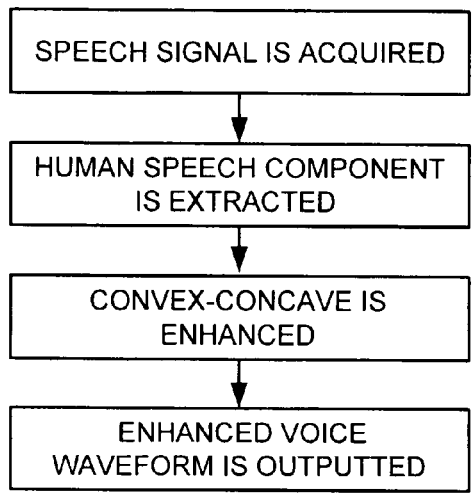

PITCH T₁

PITCH T₂

FIG.16
(a)
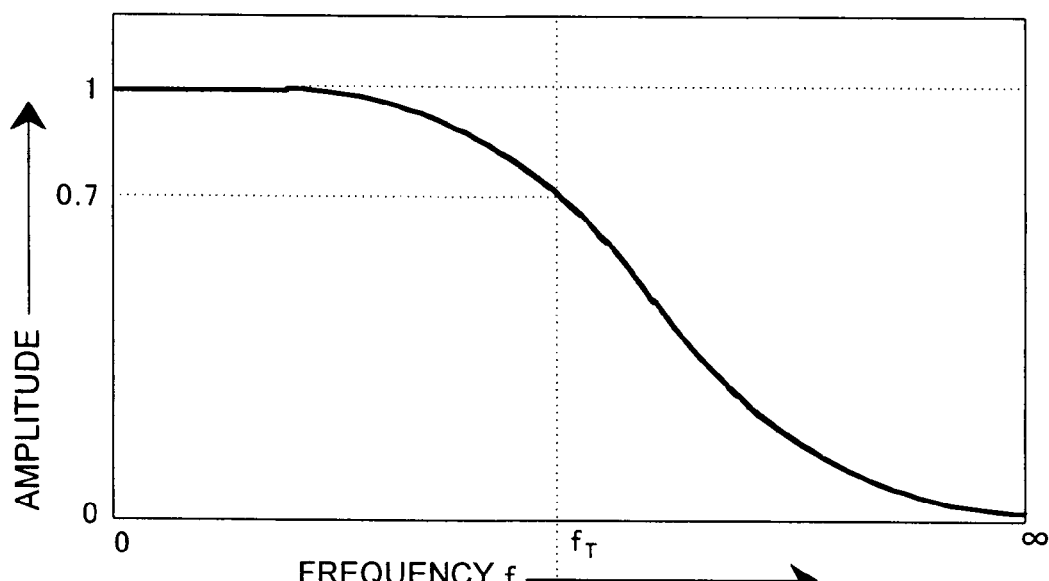
(b)
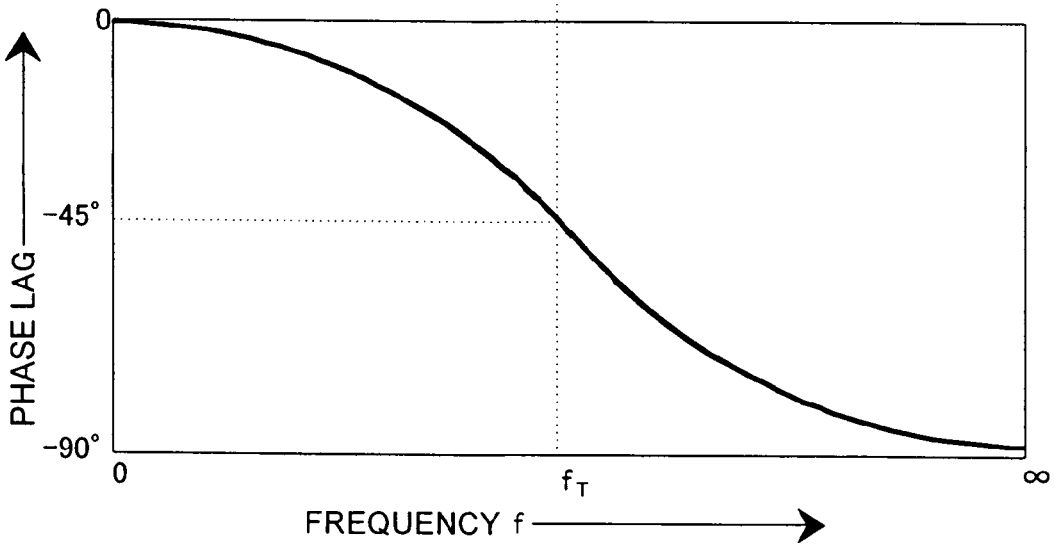

FIG.18
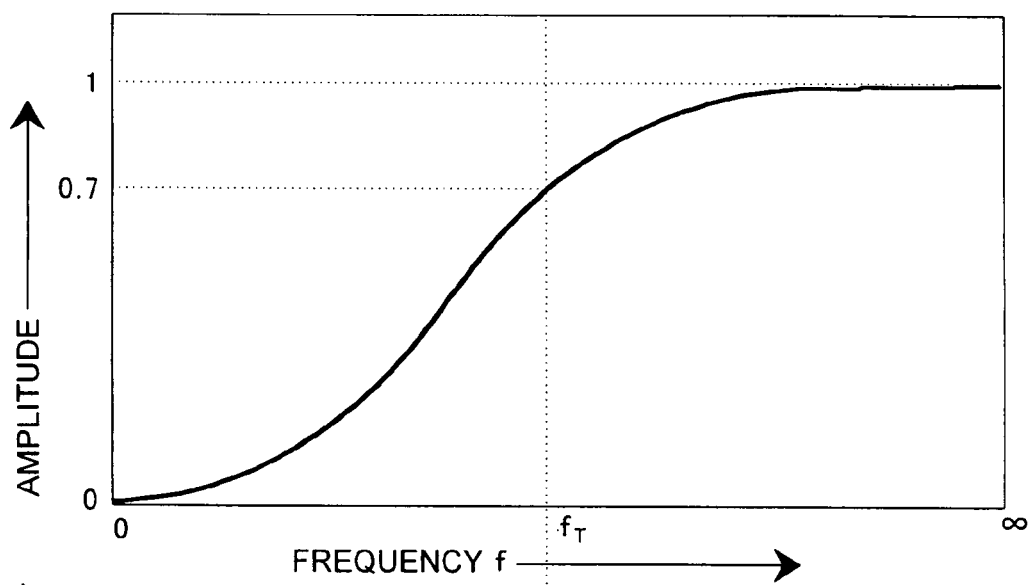
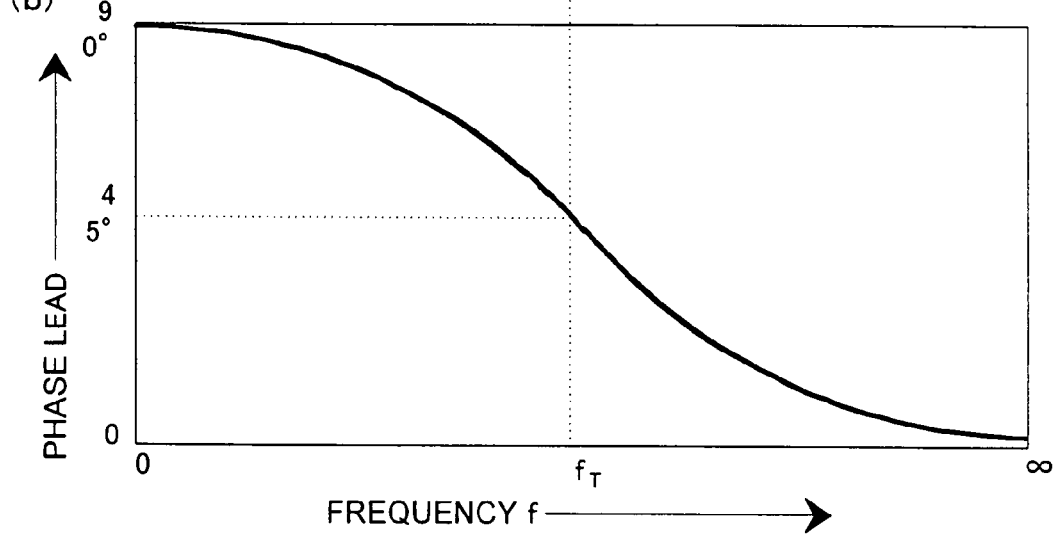

DIGITAL FILTERING METHOD, DIGITAL FILTERING EQUIPMENT, DIGITAL FILTERING PROGRAM, AND RECORDING MEDIUM AND RECORDED DEVICE WHICH ARE READABLE ON COMPUTER

TECHNICAL FIELD

The present invention relates to a digital filtering method, digital filtering equipment, a digital filtering program, and a recording medium and recorded device which are readable on a computer, in connection with a digital filter for digitizing an analog signal, and also pertains to a digital filtering method which can be employed for a speech reproduction such as in a speech recognition and a hearing aid, for an image processing, and for other purposes.

BACKGROUND ART

Speech recognizing equipment for acquiring a speech as a data to process the data and recognize speech meanings has been developed for practical use. For example, a speech recognizing engine is incorporated in computer systems for inputting speech syllables into a word-processor and in vehicle-mounted navigation systems receiving a series of speech utterance.

Generally, in a speech recognition system, a method is employed for extracting from an inputted speech signal a few parameters (referred to as a feature quantity of the speech) which characterize the feature of speech recognition and then for comparing those parameters with typical feature quantities having been registered in advance, so that the most similar speech syllable is selected from a set of typical syllables as a recognition result. In such a method, a role to be played by the feature quantity of speech is important, so that many researches are being continued to search feature quantities of speech in order to improve a speech recognition rate using a smaller number of parameters.

Well known as a representative feature vector to be used for a speech recognition are a power spectrum which can be obtained through a band pass filter or the Fourier transform, and cepstrum coefficients which can be obtained by the inverse Fourier transform and an LPC (Linear Prediction Coefficients) analysis. A time sequence of the feature vector extracted from a set of speech features is used in a pattern matching algorithm for a subsequent recognition process (see Patent Document 1, for example).

In such a method, however, an arithmetic operation performed to extract a feature quantity becomes extremely complex in a pattern-matching algorithm, resultantly requiring a certain amount of computation time. As a result, it is difficult to develop a real-time speech recognition system, because time consumption for feature extraction of speech is large.

On the other hand, in a trend that a cellular phone has gained widespread use and a mobile digital assistant is getting miniaturized, more attention is being paid to a speech-recognition technology as a man-machine interface for such equipment. In recent years, research and development are being made actively for a natural speech recognition which may not require a constraint on a speaker's speech-mode, as can be seen in a retrieval engine using key-words and a hidden Markov model (HMM) which are employed in continuous speech-recognition systems.

On the other hand, in a hearing aid for the deaf and a loudspeaker for reproducing a high quality voice and/or music, attention is paid to a technique which processes a speech signal so as to provide a clearly audible sound. In an application to such mobile equipment, a speech-recognition technology is confined to a simple algorithm with high accuracy. However, a hearing aid has not yet been developed in which an arithmetic operation for a speech-recognition system is simplified at a level of practical use.

Without being limited to a speech-recognition system alone, the Fourier transform is generally used for analytically processing a signal waveform and often for obtaining frequency spectra, etc. However, in order to apply the Fourier transform or the inverse Fourier transform, an arithmetic algorithm is so complex as to make a total amount of computation time too large, requiring a large processing capacity. Therefore, the hardware for signal processing by using the Fourier transform is complicated and expensive.

Patent Document 1: Japanese Patent Laid-Open Publication No. 2003-271190

DISCLOSURE OF INVENTION

Problem to be Solved by the Invention

The present invention has been made in order to solve the above-mentioned problems. The primary object of the invention is to provide a digital filtering method, digital filtering equipment, a digital filtering algorithm, a memory device and a mass storage which are readable on a computer, in which, in a step of processing a signal waveform, an arithmetic operation is simplified for a fast and high performance, to facilitate implementation or incorporation.

Means to Solve the Problem

In order to achieve the above-mentioned object, the digital filtering method according to a first aspect of the present invention is a digital filtering method for extracting a feature quantity based on an inputted signal waveform, and includes:

a step of inputting a signal waveform as an input signal, quantizing the signal waveform to acquire a quantized data, and storing such quantized data in a storage device;

a step, in the quantized data, of pre-establishing as a summation region a prescribed region adjoining a selected point and/or pre-establishing the number of data contained in the summation region, so that i) a summation value is obtained, at each individual point in the quantized data stored in the storage device, by summing all data values present in the quantized data contained in the summation region; ii) a division value is obtained by dividing the summation value by the number of data; and iii) optionally, a difference is calculated as a subtraction value through subtraction between the data value in the quantized data at that point and the division value; whereby the division value and subtraction value are outputted; and a step of repeating the above steps to calculate the division value and subtraction value in each individual quantized data, so that the inputted signal waveform is subjected to a digital filtering based on each division value and subtraction value which are individually outputted.

Also, in the digital filtering method according to a second aspect of the invention, the prescribed region is set to be substantially symmetrical with respect to a selected point, in the summation region.

Further, in the digital filtering method according to a third aspect of the invention, the step of effecting the digital filtering includes a step of effecting a high-pass filtering based on the subtraction value and a step of effecting a low-pass filtering based on the division value.

Still further, in the digital filtering method according to a fourth aspect of the invention, the step of effecting the digital filtering includes a step of comparing the data value in the data at each point with the corresponding division value, for transformation into the selected data points based on logical truth depending on a comparison result. Thus, the feature quantity can be extracted through an integer summation and comparison operation, so that an arithmetic operation is extremely simplified so as to assure high performance and inexpensive characteristics.

Yet further, in the digital filtering method according to a fifth aspect of the invention, a summation, a subtraction and a division are performed with an integer arithmetic operation. Thus, a floating-point operation in the digital filtering is not used for calculating an arithmetic value and the filtering results are obtained only by using a fixed-point operation. As a result, the arithmetic operation is characterized in a fast performance by using small processing devices.

Also, in the digital filtering method according to a sixth aspect of the invention, the number of data to be summed in the prescribed region is a power of two. Thus, a bit-shift operation can be applied to calculate a divided value corresponding to a power of two, and the performance of arithmetic operation is simplified, contributing to an accelerated speed.

Further, in the digital filtering method according to a seventh aspect of the invention, the division by the data number in the prescribed region corresponding to a power of two is performed with a bit-shift operation. Thus, a bit-shift operation can be performed for a division, and the performance of arithmetic operation is simplified, contributing to an accelerated speed.

Still further, as the step of calculating the division value in the digital filtering method according to an eighth aspect of the invention, a summation value is retained which is obtained by summing the data value in the prescribed data region in order to obtain a division value with respect to each data, and, for obtaining a summation value in a subsequent data, an unnecessary data value is subtracted from the retained summation value and a necessary data value is added thereto, so that a summation value is calculated. Thus, when calculating a summation value in each division operation, the summation value calculated with respect to the previous data can be used to obtain a desired summation value through interchanging necessary data, so that the summation operation can be remarkably simplified for performing the arithmetic operation with small time consumption.

Yet further, in the digital filtering method according to a ninth aspect of the invention, when a division value $\alpha_k$ in the region where the data number N is a power of two, with a point k being centered, is expressed in $$\alpha_k = \frac{\left(\sum_{i=k+1}^{n+k} x_i\right) + \left(\sum_{i=k-n}^{k-1} x_i\right)}{N},$$ Equation 3 in the step of calculating a division value, the division value $\alpha_k$ is calculated with Equation 4 by using a division value $\alpha_{k-1}$ at an anterior point k−1;

$$\alpha_k = \alpha_{k-1} + (x_{k-1} + x_{n+k} - x_{k-1-n})/N.$$ Equation 4

Thus, each division value can be sequentially obtained by using the division value obtained in the previous step, so that an amount of performing the arithmetic operation can be extremely reduced, realizing a fast and low-loaded performance of extracting the feature quantity from the signal waveform.

Even further, in the digital filtering method according to a tenth aspect of the invention, N=64 or 256.

Even still further, in the digital filtering method according to an eleventh aspect of the invention, when referring to the selected data points with N=256, the feature quantity includes a width of an initial convexity which is obtained in search from the beginning of one pitch of vowel waveform.===includes Furthermore, in the digital filtering method according to a twelfth aspect of the invention, when referring to the selected data points with N=256, the feature quantity includes an area of quantized data present in a width of an initial convexity which is obtained in search from the beginning of one pitch of vowel waveform.

Further, in the digital filtering method according to a thirteenth aspect of the invention, when referring to the selected data points with N=256, the feature quantity includes a dispersion amplitude of the waveform in a width of an initial convexity which is obtained in search from the beginning of one pitch of vowel waveform.

Still further, in the digital filtering method according to a fourteenth aspect of the invention, when referring to the selected data points with N=256, and when a feature of the normalized waveform can be extracted from a width of an initial convexity which is obtained in search from the beginning of one pitch of vowel waveform, the feature quantity includes a similarity to a sinusoidal wave generated in the width of the convexity.

Yet further, in the digital filtering method according to a fifteenth aspect of the invention, when N=64, the feature quantity includes the number of convexities appearing in the three pitches of the signal waveform.

Even further, in the digital filtering method according to a sixteenth aspect of the invention, an inputted signal waveform includes a tone signal.

Furthermore, in the digital filtering method according to a seventeenth aspect of the invention, an inputted signal waveform includes an electromagnetic wave.

Further, in the digital filtering method according to an eighteenth aspect of the invention, an inputted signal waveform includes a biological signal.

Still further, the digital filtering method according to a nineteenth aspect of the invention is a digital filtering method for extracting a feature quantity from a speech signal in order to execute a speech recognition based on an inputted speech signal, the method including:

a step of inputting a speech signal and quantizing a waveform of the inputted signal;

a step of summing a quantized data in a prescribed adjoining region to divide the summation of the quantized data by the number of the quantized data, whereby a division value is obtained with the data being centered;

a step of comparing the quantized data at each point with the corresponding division value, for transformation into the selected data points based on logical truth of a comparison result; and a step of extracting a feature quantity from the selected data points to execute a speech recognition. Thus, the feature quantity can be extracted through an integer summation and comparison operation, so that performance of arithmetic operation is extremely simplified to be fast and inexpensive.

Even further, the digital filtering method according to a twentieth aspect of the invention further includes a step of referring to a pitch being one pitch of waveform of a vowel portion in order to execute a vowel discrimination, to extract a steady-state region of a vowel waveform.

Yet further, in the digital filtering method according to a twenty-first aspect of the invention, as the step of extracting the steady-state region of the vowel waveform, anterior-posterior one pitch is extracted with a pitch being centered which is located equivalently to about two-thirds of the entire number of pitches.

Furthermore, in the digital filtering method according to a twenty-second aspect of the invention, the vowel discrimination is executed based on the feature quantity which is obtained from a combination of two vowels.

Further, in the digital filtering method according to a twenty-third aspect of the invention, a boundary line is obtained based on a discrete Voronoi diagram in which a feature quantity is mapped which is obtained by a combination of two vowels, so that the vowel discrimination is executed in the form of a vote, with the boundary line being set to be a reference line.

Still further, in the digital filtering method according to a twenty-fourth aspect of the invention, with respect to a speech after recognition, when a consonant portion is recognized, a sound volume is turned up, and when a vowel is recognized subsequent to the consonant portion, such amplified sound volume is eliminated from the vowel portion within a prescribed period of time. Thus, while a sound output is heard seemingly larger in terms of auditory sense to make the speech recognition system easier, the speech is not always heard in an increased sound volume, so that the user's discomforts can be reduced to minimum. Since a sound volume of a vowel portion in particular is larger which comes immediately after a consonant portion, the speech can be recognized more easily with the consonant and subsequent vowel. In this instance, the vowel portion in the speech can be recognized with small time consumption. When the short-time speech recognition system is developed on the basis of an auditory sense and cerebral function, there is a sequence of vowels during which the speech is reduced to a very low level. And, when a consonant is inputted again, the sound output is likewise increased to facilitate the speech recognition.

Even further, the digital filtering equipment according to a twenty-fifth aspect of the invention is digital filtering equipment for extracting a feature quantity based on an inputted signal waveform, the equipment including:

an amplitude determining section for obtaining an amplitude of an inputted signal waveform and quantizing the amplitude;

a division value operating section for summing an amplitude value in a data in a prescribed adjoining region to divide the amplitude value by the number of summed data, with respect to a data quantized at each point by the amplitude determining section, so that a division value is obtained with the data being centered;

a subtraction means for obtaining a difference by subtraction between the division value calculated by the division value operating section and the amplitude value calculated by the amplitude operating section, with respect to each data; and a storage device for retaining at least one of a summation value, a subtraction value and a division value.

Yet further, the digital filtering equipment according to a twenty-sixth aspect of the invention further includes a comparison section for comparing a division value calculated by the division value operating section and an amplitude value calculated by the amplitude operating section, with respect to each data, so that logical truth of a comparison result is outputted; and a conversion section for converting a signal waveform into the selected data points based on an output from the comparison section. Thus, the feature quantity can be extracted through an integer summation and comparison operation, so that performance of arithmetic operation is extremely simplified to be fast and inexpensive.

Furthermore, in the digital filtering equipment according to a twenty-seventh aspect of the invention, with the number of data to be summed in a prescribed region being a power of two, the division value operating section performs a division by the number of data summed in the prescribed region, on a bit-shift operation.

Further, in the digital filtering equipment according to a twenty-eighth aspect of the invention, the division value operating section retains a summation value obtained by summing an amplitude value in the data in the prescribed region in order to obtain a division value, with respect to each data, and in obtaining a summation value in a subsequent data, an unnecessary amplitude value is subtracted from the retained summation value and a necessary amplitude value is added thereto, so that a summation value is calculated. Thus, the amount of arithmetic operation can be reduced to release the performance out of a heavy load for an accelerated speed.

Still further, in the digital filtering equipment according to a twenty-ninth aspect of the invention, an inputted signal waveform includes a tone signal.

Even further, in the digital filtering equipment according to a thirtieth aspect of the invention, an inputted signal waveform includes an electromagnetic wave.

Yet further, in the digital filtering equipment according to a thirty-first aspect of the invention, an inputted signal waveform includes a biological signal.

Furthermore, the digital filtering equipment according to a thirty-second aspect of the invention is digital filtering equipment for extracting a feature quantity from a speech signal in order to execute a speech recognition based on an inputted speech signal, the equipment including:

an amplitude determining section for obtaining an amplitude of an inputted speech signal and quantizing the amplitude;

a division value operating section for summing an amplitude value in the data in a prescribed adjoining region to divide the amplitude value by the number of summed data, with respect to a data quantized at each point by the amplitude determining section, whereby a division value is obtained with the data being centered;

a comparison section for comparing a division value calculated by the division value operating section and an amplitude value calculated by the amplitude operating section to output logical truth of a comparison result, with respect to each data; and a conversion section for converting a speech signal into the selected data points based on an output from the comparison section. Thus, the feature quantity can be extracted through an integer summation and comparison operation, so that performance of arithmetic operation is extremely simplified to be fast and inexpensive.

Further, the digital filtering program according to a thirty-second aspect of the invention is a digital filtering program for extracting a feature quantity based on an inputted signal waveform, and enables a computer to carry out:

a function of inputting a signal waveform and quantizing an amplitude of such inputted signal;

a function of summing an amplitude value in a data in a prescribed adjoining region to divide the amplitude value by the number of summed data, so that a division value is obtained with the data being centered, with respect to the quantized data at each point;

a function of calculating a difference between an amplitude value in a data at each point and respective division value; and a function of retaining at least one of an calculated summation value, subtraction value and division value in a storage device as well as subjecting an inputted signal waveform to a digital filtering based on at least one value of the summation value, subtraction value and division value. Thus, the feature quantity can be extracted through an integer summation and comparison operation, so that performance of arithmetic operation is extremely simplified to be fast and inexpensive.

Also, a recording medium or recorded device which is readable on a computer according to a thirty-fourth aspect of the invention stores the above-mentioned program. Recording media include CD-ROM, CD-R, CD-RW, flexible disk, magnetic tape, MO, DVD-ROM, DVD-RAM, DVD-R, DVD+R, DVD-RW, DVD+RW, Blu-ray Disk, and HD DVD (AOD), which are classified into magnetic disk, optical disk and magneto-optical disk, semiconductor memory, and other media which are capable of storing a program. Also, programs include those which are stored in the above recording media as well as those which are distributed by downloading over the network such as the Internet. Further, recorded devices include general-purpose equipment or an exclusive type of equipment in which the above-mentioned program is installed in an executable state, in the form of software and firmware. Yet further, either each processing and function included in the program may be executed with program software which is executable on a computer, or a processing in each individual section may be realized with hardware such as a predetermined gate array (FPGA, ASIC) or in a mixed form in which program software is in cohabitation with a partial hardware module for realizing a part of factors undertaken by hardware.

EFFECT OF THE INVENTION

In accordance with the inventive digital filtering method, digital filtering equipment, digital filtering program, and recording medium and recorded device which are readable on a computer, it becomes possible to extract a feature quantity through an integer summation and comparison operation, and also a speed can be accelerated to reduce substantially an amount of arithmetic operation to be performed in processing a signal waveform. Especially, it is possible to realize a low-loaded performance in processing a waveform signal which can be implemented on mobile digital equipment with a limited CPU capacity and memory amount which result in a limited capacity of performing an arithmetic operation.

BEST MODE FOR CARRYING OUT THE INVENTION

Embodiments of the present invention will be described hereinafter in conjunction with the accompanying drawings. It should be noted, however, that the embodiments to be described below are merely illustrative of a digital filtering method, digital filtering equipment, a digital filtering program, and a recorded medium and recording device which are readable on a computer in order to embody the spirit of the present invention, and that the present invention is not limited to the digital filtering method, digital filtering equipment, digital filtering program, and recorded medium and recording device that are described below. Also, in the present disclosure, those members described in the appended claims are, in no way, specified to the members described in the embodiments. Particularly, unless otherwise specifically set forth herein, the scope of the present invention is not contemplated to be limiting to but is rather intended to be merely illustrative of the components described in the embodiments, in terms of material quality, shape, and relative disposition thereof. It should also be noted that the size, positional relationship and the like of the members illustrated in each drawing may be indicated and described in an exaggerated manner for purposes of clarity. Further, in the following description, like names and like numerals designate identical or the same members, a detailed description of which may be suitably omitted. It should also be added that each component constituting the present invention may be either realized in a manner of integrating a plurality of components into the same member to utilize such a member for a plurality of factors, or conversely, may be realized in a manner of sharing a plurality of members to perform a function of one member.

In the present disclosure, the digital filtering equipment is electrically connected with a computer, printer, external storage device and other peripherals, which are involved in operation, control, input/output, display and other processing, for communications, for example, through a serial port such as IEEE1394, RS-232x, RS-422, RS-423, RS-485 and USB, through a parallel port, or over a network such as 10BASE-T, 100BASE-TX, and 1000BASE-T. The connection is not limited to a physically wired system/mode, and may also be made with a wireless system/mode utilizing a wireless LAN such as IEEE802.1x and OFDM (transmission) system or a radio wave, infrared, optical communication including Bluetooth. Furthermore, a recording medium, which is used for preserving a signal waveform data to undergo a signal waveform processing and a processed data and also for preserving a configuration, may include a memory card, magnetic disk, optical disk, magneto-optical disk, semiconductor memory, etc.

The inventive digital filtering technique can be employed for a digital filtering in place of the Fourier transform; in a matching work for processing an image data, a real-time analysis/synthesis of a speech, and an engineering field such as thermal conduction, applied mechanics, and electromagnetic field solution where the Fourier transform and the like are currently employed. In particular, the inventive technique allows for performance with the four arithmetic operation alone without performing a complex, high-grade arithmetic operation such as a floating-point arithmetic which is essential for processing a digital signal like with the Fourier transform, so that the technique can be realized with a relatively low-cost LSI without requiring a high processing capacity and is also suitable for a real-time processing by virtue of a low-load, high-speed processing.

The digital filtering equipment for effecting a digital filtering includes: a) a quantization means for quantizing a signal waveform of an input signal being inputted; b) a storage device which is capable of storing a quantized data; c) a setting means, with respect to an optional quantized data, for pre-establishing as a summation region a prescribed region adjoining an object point and/or pre-establishing the number of data contained in the summation region; and d) an arithmetic operation means for outputting a division value and subtraction value, in which: i) the summation value is obtained, at each individual point in the quantized data stored in the storage device, by summing all data values present in the quantized data contained in the summation region; ii) the division value is obtained by dividing the summation value by the number of data; and iii) optionally, a difference is calculated as a subtraction value through subtraction between the data value in the quantized data at the point and the division value. The storage device may utilize a memory which is capable of retaining the quantized data as well as at least any one of the summation value, subtraction value, and division value. Further, the arithmetic operation section is composed of: a division value operating section for summing a quantized data in a prescribed adjoining region to divide a summation value by the number of summed data, with respect to a data quantized at each point by the amplitude determining section, so that a division value is obtained with the data being centered; and a subtraction means for obtaining a difference by subtraction between the division value calculated by the division value operating section with respect to each data.

An exemplary procedure for a digital filtering is described with reference to a flow chart in FIG. 25. First, in Step S1 a signal waveform of an inputted signal is inputted. Next, in Step S2 the signal waveform is quantized. It goes without adding that sampling and encoding may optionally be processed. In Step S3 each discrete, quantized data is stored in a memory after quantization.

Next, in Step S4 a filtering point is determined. Here, the filtering is effected sequentially for all points in the quantized data. While an object point to be filtered is sequentially switched like by an incremental processing for example, a summation value, a division value, and a subtraction value are calculated at each point. When the filtering point is determined in Step S4, a filtering is performed based on some prescribed filtering parameters. The filtering parameters are preferably set with a setting means in advance, prior to inputting a signal waveform. Items to be set include a region for summing the data values in the quantized data, that is to say, a summation region which is a certain region adjoining a filtering point, and/or the number of data contained in the summation region. In the exemplary case of FIG. 25, an establishment of summation region is accessed in Step S5, based on which a summation value S after summing data values in all the quantized data is calculated in Step S6, while the number of data N contained in the summation region is calculated in Step S7. If a sampling pitch (or a sampling frequency) of a quantized data is already known, the number of data does not need to be calculated, and it will suffice to simply access N as a prescribed value, because the number is uniquely determined in the summation region. Conversely, when the number of data N and a sampling pitch are already determined, it will suffice to access the summation region simply as a prescribed value, because the summation region is uniquely determined. In either case, the filtering parameters required for arithmetic operation is acquired by the setting means in advance.

When the summation value S and the number of data N in the summation region are thus calculated, a division value A can be calculated, in Step S8, through dividing the summation value S by the number of data N. Further, optionally in Step S9, a subtraction value B is calculated by subtracting the division value A from the data value at the filtering point (or vice versa). Then in Step S10, the division value A and/or the subtraction value B are outputted as resulting from a filtering. In this manner, when a filtering value at one filtering point is calculated, the filtering value is temporarily stored in the memory, and then turning to Step S11, a filtering point is changed to repeat the above-mentioned arithmetic operations. At a final stage, by using the filtering values which have been obtained for all the quantized data, a desired filtering is effected. This filtering is suitably selected depending on a use where the present invention is applied.

FIG. 1 shows a block diagram in which digital filtering equipment is applied for a speech recognizer as one embodiment of the invention. The speech recognizer 100 shown in FIG. 1(a) includes a microphone 10, a noise elimination device 12, a feature quantity extracting section 14, a similarity determining section 16, a standard model dictionary 20, and a discrimination section 18.

To add, in FIG. 1 (a) a speaker's speech is inputted through a microphone and converted to a digitized electric signal (digital speech signal) through an A/D (analog/digital) converter, but the speech data may be directly inputted, and otherwise the speech data may be inputted from an external device connected to a network.

A speech taken up through the microphone 10 is inputted into the noise elimination device 12, where the speech is subjected to a frame analysis at a pitch of about 10 ms to remove background noises and transmission characteristic noises inherent to the microphone and transmission channel. Then, a feature quantity is extracted by the feature quantity extracting section 14 to be used for a speech recognition. And then, a similarity to a feature quantity of a plurality of words having already been registered in the standard model dictionary 20 is determined by the similarity determining section 16. The discrimination section 18 judges whether or not such similarity is larger than a certain threshold value; when larger, that word is outputted as a recognition result. These various members for performing an arithmetic operation, such as the feature quantity extracting section 14, the similarity determining section 16, and the discrimination section 18, may be realized by hardware and software including a logic circuit and central processing section, such as a microprocessor (MPU), CPU, LSI, and gate array (such as FPGA and ASIC), or their mixture. Yet, each component may not necessarily be of the same configuration as shown in FIG. 1; it should be understood that the present invention may include either components with substantially the same function or one component equipped with functions of a plurality of elements in a configuration as shown in FIG. 1.

A feature quantity has typically been calculated and extracted by utilizing cepstrum coefficients to obtain a logarithmic spectrum by means of a logarithmic transformation, for the inverse Fourier transform or inverse cosine transform. In this method, however, arithmetic operation to frequency spectrum or the like is required, resulting in a heavier load of processing amount, hence the inventive embodiment employs a method of extracting a feature of each vowel from the quantized data. By extracting the speech feature from the quantized data, it is possible to omit an arithmetic operation as required in transformation to a frequency spectrum or the like, so that computational effort can be made relatively with reduced computation time. An acquired feature quantity is used to divide a region according to a discrete Voronoi diagram, so that a boundary coordinate of different categories is calculated to determine a discrimination boundary line based on a least square method.

A standard model includes a method called a hidden Markov model (HMM) in which a time sequence of a feature quantity each for a plurality of vocabulary to be recognized is expressed as a stochastic transition. HMM is a method in which a time sequence of a feature quantity of a speaker-dependent vocal sounds and words is taught to the HMM model in advance to catch and recognize an inputted speech-similarity to the model in terms of probability value. As another standard model, a model may be a time sequence of a representative feature quantity among time sequences of feature quantities each of a plurality of vocabularies to be recognized, or a model may be a normalized time sequence of a feature quantity which is obtained by normalizing (companding) a time sequence in terms of time or frequency. For example, a DP matching (Dynamic Programming Approach) may be considered as a method of normalizing to an optional length on a timing axis, where a time sequence of a temporal feature quantity may be normalized in accordance with predetermined rules for correspondence.

Either of such standard models as mentioned above may be employed in the present embodiment. It should be noted, however, that in either case, a plurality of speech data must be prepared in advance as needed for making up a standard model, so that the quantized data of inputted speech is equally processed to be converted to the selected data points for registration.

Feature Quantity Extracting Section.

As shown in FIG. 1(b), the feature quantity extracting section 14 includes an amplitude determining section 22, a division value operating section 24, a comparison section 26, and a conversion section 28. In the amplitude determining section 22, a quantization is executed based on a quantized data of an inputted waveform. In the division value operating section 24, the quantized data is employed for obtaining a division value at each point. Here, as shown in FIG. 2(a), the division value is obtained for N (number of data) with a sample point being centered. That is, with the sample point k being centered, the quantized data values are summed to be divided by N, for anterior n (=N/2) number of data and posterior n number of data. Specifically, with N=2×n, the division value $\alpha_k$ obtained from a sample value at the anterior-posterior point n of $x_k$ is calculated with Equation 5 as:

$$\alpha_k = \frac{\left(\sum_{i=k+1}^{n+k} x_i\right) + \left(\sum_{i=k-n}^{k-1} x_i\right)}{N}. \qquad \text{Equation 5}$$

Here, the suffix "k" designates a sample point which is currently referred to. $x_k$ designates a quantized data value at point k. Also, N designates a width for computing a threshold value to be used for determining the selected data points. Here, by setting N to be a power of two, a binary number is preferred for division, because a bit-shift operation can be utilized to make arithmetic operation simplified in the division value operating section 24.

The division value thus obtained with respect to each point in the division value operating section 24 is compared with a quantized data value in the comparison section 26. Specifically, the quantized speech signal $x_k$ for the point k is compared with its division value $\alpha_k$ to output a comparison result as expressed in Equation 6 as:

$$B_k = \begin{cases} a(\alpha_k < x_k) \\ b(\alpha_k > x_k). \end{cases} \qquad \text{Equation 6}$$

In this manner, the comparison section 26 calculates a division value with respect to each point in the quantized data to output a signal to be obtained depending on whether the quantized data value at point k is larger or smaller than each division value. If the comparison result indicates that $x_k$ is above the division value, "a" is outputted by the comparison section 26, and if $x_k$ is below the division value, "b" is outputted. Such result is outputted in a digitized waveform in the conversion section 28. For example, if a=1 and b=0, the quantized data can be expressed in the selected data points with concavity or convexity (0 or 1). The selected data points indicate, in the region of N data points where the division value is calculated, whether $x_k$ is above the division value, that is, the waveform is convex, or $x_k$ is below the division value, that is, the waveform is concave. Therefore, when the value of N is allowed to vary, the concavo-convexity of the original quantized data can be expressed in a rough or fine mode, so that a plurality of feature quantities can be extracted by allowing N to vary as a parameter. By thus expressing the characteristic of the quantized data in a simplified mode of concavo-convexity alone, a necessary feature quantity can be extracted to be applied as a model for a speech recognition. In particular, a feature quantity expressed in a concavo-convexity alone can realize a segmentation of a consonant portion and a vowel portion from a speech waveform even in an information processing function which is not of a very high grade. Also when a speech output is to be treated based on a recognized speech, it is possible to vary an amount of the speech output within practical time consumption.

Further in calculating a division value, when obtaining a summation value of the quantized data, an arithmetic operation can be simplified by utilizing a value calculated at an adjoining position. That is, in order to obtain a division value for a certain data, the summation value obtained by summing the N (=2n) quantized data is retained for subsequent use. At this stage, the division value $\alpha_k$ can be calculated in Equation 7 as:

$$\alpha_k = \frac{\sum_{i=k-n}^{k-1} x_i + \sum_{i=k+1}^{n+k} x_i}{N} \qquad \text{Equation 7}$$

$$= \frac{\sum_{i=k-n}^{k-2} x_i + x_{k-1} + \sum_{i=k+1}^{n+k-1} x_i + x_{n+k}}{N}$$

Here, the division value $\alpha_k$ can be deformed to Equation 8 as:

$$\alpha_k = \frac{\sum_{i=k-n}^{k-2} x_i + \sum_{i=k+1}^{n+k-1} x_i}{N} + \frac{x_{k-1} + x_{n+k}}{N}. \qquad \text{Equation 8}$$

On the other hand, the division value $\alpha_k$, as expressed in the above-described Equation 5, can also be expressed in Equation 9 as:

$$\alpha_k = \frac{\sum_{i=k-n}^{k-1} x_i + \sum_{i=k+1}^{n+k} x_i}{N}. \qquad \text{Equation 9}$$

Therefore, when k is replaced by k−1, a division value $\alpha_{k-1}$ regarding a data of k−1, namely one number ahead of k, can be expressed in Equation 10 as:

$$\alpha_{k-1} = \frac{x_{k-1-n} + \sum_{i=k-n}^{k-2} x_i + \sum_{i=k}^{n+k-1} x_i}{N}. \qquad \text{Equation 10}$$

Further, $\alpha_{k-1}$ is deformed to Equation 11 as:

$$\alpha_{k-1} - \frac{x_{k-1-n}}{N} - \frac{x_k}{N} = \frac{\sum_{i=k-n}^{k-2} x_i + \sum_{i=k+1}^{n+k-1} x_i}{N}.$$

Equation 11

When the division value $\alpha_k$ is obtained in place of $\alpha_{k-1}$ in the above-described Equation 11, the division value is expressed in Equation 12 as:

$$\alpha_k = \frac{\sum_{i=k-n}^{k-2} x_i + \sum_{i=k+1}^{n+k-1} x_i}{N} + \frac{x_{k-1} + x_{n+k}}{N}.$$

Equation 12

Further, $\alpha_{k-1}$ is rewritten to Equation 13 as:

$$\alpha_{k-1} - \frac{x_{k-1-n}}{N} - \frac{x_k}{N} = \frac{\sum_{i=k-n}^{k-2} x_i + \sum_{i=k+1}^{n+k-1} x_i}{N}.$$

Equation 13

The above-described Equations 12 and 13 are reduced to Equation 14 as:

$$\alpha_k = \alpha_{k-1} + \frac{x_{k-1} + x_{n+k}}{N} - \frac{x_k + x_{k-1-n}}{N}$$

$$= \alpha_{k-1} + \frac{x_{k-1} + x_{n+k} - x_k - x_{k-1-n}}{N}.$$

Equation 14

From Equation 14, it becomes possible to sequentially calculate the division value $\alpha_k$ by using the preceding division value $\alpha_{k-1}$ which has been calculated in its anterior step. In other words, if $\alpha_{k-1}$ is calculated, then the new division value $\alpha_k$ can be calculated by using the following Equation 15.

$$\alpha_k = \alpha_{k-1} + (x_{k-1} + x_{n+k} - x_k - x_{k-1-n})/N$$

Equation 15

Thus, it is possible to sequentially obtain $\alpha_{k+1}, \alpha_{k+2}, \ldots, \alpha_{k+n}$. The above operation can be diagrammatically depicted as in FIG. 2(b). As can be seen in this Figure, the data points for calculating $\alpha_k$ and $\alpha_{k-1}$ have a common region. Consequently, an arithmetic operation can be finished in a simple computation for these data in this common region, and when the operational result is stored in a storage device such as a memory, it can be utilized for the successive arithmetic operation, reducing the total computation time. As described above, a performance of arithmetic operation is allowed to be extremely low-loaded by simplifying an arithmetic operation as well as reducing an amount of operation, so that an algorithm can be obtained in calculating all the division values $\alpha_k$ through a very simple arithmetic operation. It is, therefore, possible to execute a feature quantity extraction for a speech recognition from a speech waveform in a quick and simple manner, for a very high practicality.

Example 1

Next, by way of Example 1, an experimental result of a vowel recognition by using a feature quantity extracted through a computer simulation will be shown in FIGS. 3 through 10.

Speech Data

In Example 1, as a feature quantity extracting section 14 for extracting a feature quantity from a speech data, an integrated circuit (IC) was used which was exclusively fabricated in a combination of analog processing and digital processing sections to make the best use of speech characteristics. A speech characteristic is in that a speech signal expressed in a waveform is typically asymmetric in a positive swing and a negative swing, and in that a pressure fed out of vocal cords is based on generation and attenuation of a pulse signal. With these points in mind, when a speech signal received from a microphone 10 is measured in terms of a voltage level, a pitch is detected by retaining maximum levels of both positive and negative electrical power simultaneously for a certain period of time, while a time period is detected until subsequent positive and negative voltage levels are detected. Use of this IC enables a speech waveform and pitch to be detected. FIG. 3 shows such speech waveform and pitch information obtained by using the IC.

Also, vowel classification is executed in the form of votes, by using a combination of two vowels obtained from five vowels. Then, feature extraction and analysis for speech recognition are effectively executed by using characteristics of the quantized data. In Example 1, 17 sets of speech data composed of 67 phonemes are obtained from one adult male. A sampling frequency is 81.92 kHz. Further, a speech is obtained in a natural utterance and a conscious utterance; the natural utterance is made in a speech spoken regardless of time in a day, and the conscious utterance is made in a speech spoken with articulate phonemes at a calm time period at night. As for a speech length, the number of pitch obtained in a conscious utterance is about 1.5 times the number of pitch obtained in a natural utterance.

Vowel Waveform Extraction and Preliminary Treatment

In order to execute a vowel discrimination, a steady-state region for a vowel is extracted from a phonemic data, referring to a pitch having been obtained by using the IC. Then, extracting one anterior-posterior pitch with the pitch being centered which is equivalent to two-thirds of a pitch number, the three pitches of a signal are used to extract a feature as a steady-state vowel waveform. And then, data points are selected from the three pitches of vowel waveform. Here, respectively, FIG. 4 shows the three pitches of steady-state vowel waveform which is an original quantized data, FIG. 5 shows one pitch of selected data points extracted from FIG. 4, with N=256, and FIG. 6 shows one pitch of selected data points extracted from FIG. 4, with N=64. In these Figures, a=0.8 and b=0.2 are as in Equation 6 described above. When FIG. 5 and FIG. 6 are compared, it can be seen that FIG. 6 with a smaller N has fine selected data points where a concavo-convexity in the quantized data is finely extracted, and FIG. 5 with a larger N has a concavo-convexity in the quantized data roughly extracted. In Example 1, a recognition experiment is thus performed by using the selected data points having been obtained by dually setting N to be 256 and 64. However, while N values of 256 and 64 as a width for generating the selected data points are empirically determined, it is needless to say that values other than these numbers may be set as well.

By using the quantized data and selected data points thus obtained, a feature extraction for vowel recognition is executed in a timing domain. The feature quantity is primarily extracted from one pitch of waveform. In the one pitch of waveform, a similarity defined by Euclidean distance is calculated from a point which is a starting point of the three pitches of waveform, and the two pitches with short Euclidean distance are selected. Anterior speech data points are selected for feature extraction. This is because a vowel waveform is extracted in the half portion coming after the center, where a vowel waveform located in the first half rather than a vowel waveform located in the latter half is considered to be a waveform maintaining a more feature of a vowel. A feature is extracted both from a waveform portion equivalent to one pitch of waveform and three pitches of the selected data points. A feature quantity for vowel recognition is described in the following. The five feature quantities are extracted from the selected data. The proposed system for discriminating a vowel determines a vowel as desired to discriminate by the number of votes for a vowel selected from each combination of two out of five vowels. In order to determine a vowel to be selected from the combination of two vowels, a feature for discriminating each two vowels varies for each combination. A relatively high discrimination rate is considered to be obtained by selecting in each combination a feature quantity which is easier to discriminate two vowels. The five feature quantities to be extracted are described as under.

(1) in referring to "256" selected data points, a width of an initial convexity which is obtained in search from the beginning of one pitch of vowel waveform (2) in referring to "256" selected data points, an region of quantized data present in a width of an initial convexity which is obtained in search from the beginning of one pitch of vowel waveform (3) in referring to "256" selected data points, a dispersion value of quantized data present in a width of an initial convexity which is obtained in search from the beginning of one pitch of vowel waveform (4) in referring to "256" selected data points and through 0, 1 normalization of a quantized data present in a width of an initial convexity which is obtained in search from the beginning of one pitch of vowel waveform, a similarity to a sinusoidal wave generated in the width of the convexity (5) the number of convexities present in the three pitches of "64" selected data points The feature quantity 4 is described in the following. First, a sinusoidal wave is generated in order to extract the feature quantity 4. The sinusoidal wave is processed in the following manner:

(1) The 0, 1 normalization is executed for the quantized value in the convex region to detect a position of the maximum value in the quantized value.

(2) The sinusoidal wave ranging from 0 to $\pi/2$ is generated between the starting point and the point of the maximum value, and the sinusoidal wave ranging from $\pi/2$ to $\pi$ is generated between the point of the maximum value and the end point.

Examples of a waveform obtained from the sinusoidal wave and the quantized waveform are shown in FIGS. 7 and 8. FIG. 7 depicts /e/ phonemic waveform and the generated sinusoidal wave in the convexity portion. FIG. 8 depicts /o/ phonemic waveform and the generated sinusoidal wave. The feature quantity 4 is determined by sequentially calculating angles at four points from these two waveforms, and by calculating the angular difference. Most of these feature quantities are composed of the feature quantity in the convexity portion located at the beginning of one pitch. This portion is the most variant in a vowel waveform (steady-state waveform), and a feature of each vowel is considered to be appearing. The convexity portion located at the beginning of speech signal is detected from one pitch of "256" selected data. Such a convexity portion is discovered in the posterior data of the largest concavity.

Experiment of Vowel Recognition

Next, vowel discrimination is executed using the extracted feature quantity, under application of a discrete Voronoi diagram and least square method. The discrete Voronoi diagram is a diagram to depict a sphere being under the influence by a multitude of generatrices located in a space. The discrete Voronoi diagram discretizes the space populated by the generatrices, and determines typical feature spaces, based on judgment which generatrix a respective pixel is close to. The discrete Voronoi diagram employed in the present Example applies an incremental insertion method (incremental algorithm). This is a method in which one generatrix each is added to the discretized space so that a discrete Voronoi diagram is produced at a high speed by efficiently producing solely a new Voronoi domain. The discrete Voronoi diagram employed in the present Example has a domain of 5160×5160, in which a correspondence to each generatrix is equally divided from 0 to the maximum value by using the maximum value of generatrix having been obtained.

Vowel Discrimination Algorithm

Discrimination algorithm is performed by a combination of two vowels ($_5C_2$). Then a vowel is selected using a feature quantity suitable for each combination to determine a vowel for discriminating by the number of votes obtained from the entire combinations. The feature quantity (used for discrimination) suitable for the respective combination is depicted in Table 1.

TABLE 1 combination of feature quantity for discrimination

| /a/-/i/ | /a/-/u/ | /a/-/e/ | /a/-/o/ | /i/-/u/ |
|---------|---------|---------|---------|---------|
| 1-2 | 1-2 | 1-2 | 1-2 | 1-5 |
| /i/-/e/ | /i/-/o/ | /u/-/e/ | /u/-/o/ | /e/-/o/ |
| 1-2 | 1-2 | 1-4 | 1-2 | 3-4 |

Here in Table 1 showing a combination of feature quantity for discrimination, the upper line of /a/-/i/, for example, designates a combination of each vowel, while the lower line of 1-2, for example, designates the numbers (1) and (2) of the feature quantity employed. Selection of the feature for discriminating these two vowels is empirically determined after distribution of feature quantity extracted from all the data is investigated and checked with eyes. Further, two feature quantities are employed for a vowel discrimination because a misclassification is likely to occur when a discrimination is executed using a single piece of feature regarding a data in the vicinity of the boundary where the same vowel may have an expanded distribution, although shorter processing time will suffice with a simplified threshold processing through discrimination using a single piece of feature quantity. An intention is in that the check of data distribution with eyes is performed before the two selected feature quantities are applied, and in that a non-linear discrimination rather than a linear threshold processing is possible in reducing the number of operations to minimum.

The vowel discrimination in the present technique serves to search for a boundary line of two classes of vowel combinations under the discrete Voronoi diagram. The feature quantity having been obtained undergoes mapping to be divided into Voronoi domains. Then the domains are integrated on the basis of the same category to obtain the coordinates for the boundary portion between the two classes. Then, the boundary line composed of the coordinates is processed by the least square method to calculate a function corresponding to the boundary line. The function of the boundary line is used to execute the vowel discrimination in the form of votes between the two classes. Only if the largest number of vowel in the vote exists, this vowel is treated as being recognized, and the other candidate vowels are deleted. Here, in the discrimination for a combination other than /i/ and /u/, the extracted feature quantity remains to be used. However, in the discrimination for /i/ and /u/, the value is converted by taking a common logarithm of the feature quantity 1. This is because a scale of the value in the feature quantity 1 is large as compared with the feature quantity 5, so that the function of the boundary line may be easier to obtain under application of the least square method. Also, for a comparison experiment, a recognition experiment is executed using Mahalanobis distance. In this experiment, selection of a vowel from each combination is made on the basis of Mahalanobis distance. The Mahalanobis distance designates a distance with a dispersion from the center of data distribution being taken into consideration. The feature of the vowel extracted in the present Example is a feature quantity with a polarized distribution. For this reason, discrimination by Mahalanobis distance is considered to be effective. The number of each vowel data based on a conscious speech amounts to 188, while the number of each vowel data based on a natural speech amounts to 178. And, Table 2 and Table 3 show the discrimination results based on the natural speech and conscious speech which are obtained from Voronoi diagram and Mahalanobis distance by using a feature quantity suitable for each discrimination. Table 2 depicts a recognition rate by a sole primary candidate in the natural and conscious speeches using the discrete Voronoi diagram, while Table 3 depicts a recognition rate by a sole primary candidate in the natural and conscious speeches using Malahanobis distance.

TABLE 2

Recognition rate by a sole primary candidate in the natural and conscious speeches using the discrete Voronoi diagram

| natural speeches | | | | | | conscious speeches | | | | | |
|---|---|---|---|---|---|---|---|---|---|---|---|
| /a/ | /i/ | /u/ | /e/ | /o/ | average | /a/ | /i/ | /u/ | /e/ | /o/ | average |
| 99.4 | 91.5 | 94.9 | 91.5 | 90.4 | 93.5 | 98.9 | 97.3 | 97.8 | 98.9 | 98.4 | 98.2 |

TABLE 3

Recognition rate by a sole primary candidate in the natural and conscious speeches using Malahanobis distance

| natural speeches | | | | | | conscious speeches | | | | | |
|---|---|---|---|---|---|---|---|---|---|---|---|
| /a/ | /i/ | /u/ | /e/ | /o/ | average | /a/ | /i/ | /u/ | /e/ | /o/ | average |
| 95.2 | 91.4 | 82.4 | 98.4 | 88.2 | 91.1 | 98.4 | 97.3 | 90.4 | 100.0 | 90.9 | 95.4 |

In the above-mentioned method, the boundary line under application of the discrete Voronoi diagram allows a recognition rate to be improved from the recognition experiment executed using Mahalanobis distance. Since the boundary line can be clearly derived from the discrete Voronoi diagram, the recognition rate is greatly improved. Also, as shown in Table 3, judging from the recognition result using Mahalanobis distance, both the natural and conscious speeches have lower recognition rates of /u/ and /e/, comparing with the other vowels, because the extracted feature-regions of /i/ and /u/, and /e/ and /o/ are overlapped. Some vowel features in the vicinity of the boundary is considered not to have undergone a correct discrimination, although a boundary is obtained with a due consideration to a dispersion based on Mahalanobis distance. Therefore, it is considered that a correct dispersion for each vowel is not computed from the speech signal data and that the calculated vowel features are distributed non-uniformly.

A distribution of the feature used in the conscious speech is now illustrated in FIGS. 9 and 10. FIG. 9 shows a feature distribution regarding /i/ and /u/ while FIG. 10 shows a feature distribution regarding /e/ and /o/. As shown in these figures, the conscious speech is better in result than the natural speech because the vowel waveform is uttered consciously. Thus by making a conscious speech, a relatively better result of discrimination is obtained. Further, it is considered that a smaller scale of hardware configuration is applicable because an extraction of feature quantity and discrimination by Mahalonobis distance are executed solely by a simple processing. A recognition accuracy is far better which employs the discrete Voronoi diagram. Therefore, if a discrete Voronoi space can be suitably configured, it can be considered that a smaller scale of hardware could be constructed using the discrete Voronoi diagram. Thus, a relatively good recognition accuracy is considered to be obtained from the application shown in Example 1. Also, by retaining a domination map rather than by obtaining a boundary line, the feature quantity can also be compared with the domination map to determine a vowel.

As described above, the present Example enables a speech recognition system to be realized for mobile digital equipment. An extraction of feature quantity from the vowel data and a discrimination of five vowels are executed by using a relatively simple arithmetic operation to verify the effectiveness for smaller hardware in particular, Further by normalizing the scale of feature quantity by such as a division value, the discrete Voronoi diagram becomes applicable with a smaller space to reduce time to be involved in arithmetic operation. Also applicable is extraction of the feature which enables clearer discrimination. For example, SVM can be used which is a technique suitable for classifying a discrimination boundary line into two. Also, since there is a difference for one pitch each of vowel waveform, a steady-state vowel waveform may be specified or a variation in pitch width may be investigated for a vowel from the start to the end of a speech so as to be registered as a standard model, thus providing a further improvement in extraction of a feature effective for discrimination and in time to be involved in arithmetic operation.

Example 2

Deaf-Aid Function

Furthermore, the present invention includes a wide range of applications for a preliminary treatment in processing a speech signal, so that an inputted speech signal can not only be recognized but an outputted speech can also be processed, like when processing a speech to be made more audible. As a deaf-aid function of making a speech more audible, the inventive function is applicable to a hearing aid, etc.

A conventional type of hearing aid is designed to simply amplify a total detected speech signal into an increased sound volume. However, when a sound volume is increased which is outputted from the hearing aid, it goes that noises other than an intended sound are heard loudly, with a loud banging noise coming into a user's ear, which tends to cause a disorder of headache and discomforts. Also, in the case of a smaller loudspeaker, the sound is distorted, with its tone quality being degraded. Further, when a sound volume is increased, an electric power is to be consumed that much, making it difficult to use the hearing aid for a long period of time. In addition, the hearing aid will have a shortcoming that an aural speaker becomes larger in caliber, weight and overall dimension.

On the other hand, when the inventive function of extracting a feature quantity of a speech signal is applied, it is possible to process a less audible component in a speech to make it audible enough. To add an explanation, a speech is composed of consonants and vowels; a vowel is more audible because of its relatively large sound volume, while a consonant is a less audible portion because the consonant tends to be shorter in time and smaller in a sound volume. Thus, when the consonant portion is enhanced, the speech can be made sufficiently audible. In order to distinguish a consonant from a vowel in a detected speech signal, the above-mentioned speech recognizing technique can be applied. In this case, a vocalized sound need not to be specifically discriminated, and it suffices to simply distinguish a vowel from a consonant, resulting in an improved accuracy as well as an even more simplified processing. The consonants and vowels are thus distinguished, and the speech signal is processed prior to reproduction.

Here, in the algorithm for adjusting, substantially on a real-time basis, the sound volume while in reproduction, when a consonant portion comes in, which is less audible and shorter in time, the sound volume is increased, with other portion being maintained in an ordinary sound volume. Since a sound volume of a vowel portion is generally larger which comes immediately after a consonant portion, the speech can be recognized with the consonant and subsequent vowel. In this instance, a speech recognition is finished for the vowel portion in a short-time, temporal waveform of one pitch up to a few pitches. When the short-time speech recognition is finished on the basis of an auditory sense and cerebral function, there follows a vowel after that, during which period of time an output signal of the speech is reduced to a very low level. And, when a consonant is inputted again, the sound output is likewise increased. Through this operation, a sound output is made seemingly larger in terms of an auditory sense, but the speech is not constantly heard in an increased sound volume, so that the user's discomforts can be reduced to minimum. Optionally, the sound volume of a vowel may be turned down as well.

An important factor to be noted in the above-mentioned algorithm for processing a speech signal is a processing in which a sound output is allowed to increase from an ordinary or lowered state of sound output, at the point when a consonant is inputted. In a conventional system, an amount of processing a speech recognition itself is large, and when further added with such a processing for a change in sound volume, the time and processing amount to be involved in detecting a consonant in a speech are increased, which makes it difficult to be of practical use. In the inventive algorithm, on the other hand, consonant and vowel portions can be detected through an integer operation alone, so that it becomes possible to detect a consonant through a very short-time, simple signal processing. Since the proposed algorithm is simple and computation time is short, it can be easily incorporated and implemented to a small-scale system such as mobile digital equipment including a hearing aid and cellular phone. In particular, when an IC for exclusive processing use is prepared to allow the above-mentioned digital signal to be processed, a segmentation of consonant and vowel portions from the speech waveform can be realized even in a less high-grade information processing function possessed by mobile digital equipment, so that an amount of speech output can be improved within a practical processing speed. Thus, Example 2 promises a high value for practical use in that it can be executed at a high speed and in a simple manner by integer operation alone, without using a floating-point arithmetic which requires a longer time for processing and a larger scale integrated circuit. Also, while DSP (Digital Signal Processor) or the like is typically employed in processing a speech signal, it is difficult to implement DSP to a cellular phone and the like, because a long processing time is required in a floating-point arithmetic as well as a scale of integrated circuits is increased. The above-described algorithm, on the other hand, can be processed at a high speed through an integer operation and bit-shift operation alone, so that the algorithm can be implemented by using small-scale integrated circuits. It is a great advantage, for practical use, that the algorithm can be implemented to small-scale equipment such as mobile digital equipment and a hearing aid.

Furthermore, the hearing aid can be tuned to a frequency (response) characteristic to be specific for a user. By tuning the frequency characteristic of a speech fed out of a loudspeaker in the hearing aid so as to coincide with a user's aural characteristic, a less audible frequency can be subjected to correction, so that a speech may be appropriately listened which is audible specifically to the user.

Thus, in accordance with the present invention, a mobile digital hearing aid can be developed, which can make a speech audible with a high quality. In particular, since a battery size is limited for use with a small hearing aid, its power consumption should be as small as possible. Hence, the digital filtering method as disclosed in the present invention can be ideal with a smaller amount of arithmetic operation to be performed and a smaller amount of power consumption.

Also, the present invention can be easily implemented to mobile digital equipment other than a hearing aid. That is to say, in equipment having a loudspeaker for reproducing a speech, such as a cellular phone and PHS, it is possible to make a spoken content audible enough under application of the above-mentioned processing. In particular, a cellular phone is very much required to be smaller in size, lighter in weight, and longer in duration of continuous operation, and yet being required to assure a higher performance, so that the excellent function is very practical in that a speech can be clearly reproduced with a lower power consumption like in the present invention. In addition to the above, by having a configuration for reproduction adjusted to a frequency characteristic which corresponds to a user of the cellular phone, it is possible to realize a cellular phone in which a speech can be listened in an optimal state depending on a user. This enables a person, who does not use a hearing aid, to conveniently use a cellular phone by making a speech audible enough over the phone. In particular, since a speech outputted from the loudspeaker in an ordinary type of cellular phone has a small output power, and the phone is also designed for a person with a healthy aural characteristic, the phone is likely to be found difficult for use by an aged person having his or her aural characteristic lowered. In the present invention, it is possible to realize a cellular phone designed for use by an elderly person or a senior citizen by allowing a speech to be audible enough.

Digital Filtering of Speech Signal

An example will now be described of an auditory sense assisting device where a technique is applied which makes a speech audible under the application of the digital filtering in accordance with an embodiment of the present invention. FIG. 11 shows a block diagram of a hearing aid as an example of an auditory sense assisting device. The auditory sense assisting device 200 shown in FIG. 11(a) includes a speech inputting section 10A, an A/D (analog/digital) converter 12A, a convex-concave converting section 14A, a speech component extracting section 16A, an enhancement processing section 18A, and a speech outputting section 20A. For the speech inputting section 10A, a microphone, speech inputting terminal, etc. can be employed. Especially when using as a hearing aid, a speech signal inputted through a microphone is converted by the A/D converter 12A into a digital speech signal, to be fed out to the speech component extracting section 16A. However, it is also possible to suitably employ a form of directly inputting a digitized speech data through the speech inputting section 10A, or a system of inputting a speech data from an external device connected to a network. The speech signal taken up from the microphone is inputted into a noise elimination device such as an analog filter, where the signal is subjected to a frame analysis in a pitch of about 10 ms to remove a background noise and a transmission characteristic noise inherent to a microphone and a transmission channel. Then, the speech signal is converted by the A/D converter 12A into a digital speech signal, which is then quantized by the convex-concave converting section 14A into the selected data points. Further, a speech component corresponding to a human voice is extracted from the selected data points by the speech component extracting section 16A to be corrected by the enhancement processing section 18A into an enhanced voice waveform, and finally to be outputted from the speech outputting section 20A. The speech outputting section 20A is such as a loudspeaker and a speech outputting terminal. The various members for performing an arithmetic operation such as the convex-concave converting section 14A, the speech component extracting section 16A, and the enhancement processing section 18A can be realized by hardware and software including a logic circuit and central processing section, such as a microprocessor (MPU), CPU, LSI, and gate array such as FPGA and ASIC, or their mixture. Yet, each component may not necessarily be of the same configuration as shown in FIG. 11; it should be understood that the present invention may include either components with substantially the same function or one component equipped with functions of a plurality of elements in a configuration as shown in FIG. 11.

Next, with reference to a flow chart in FIG. 12, an example will be described of a procedure for making a speech audible under the application of the digital filtering to the hearing aid which is illustrated in FIG. 11. As shown in FIG. 12, after acquiring a speech signal waveform through the speech inputting section 10A, a human voice component is extracted through the speech component extracting section 16A, and the selected data points are enhanced through the enhancement processing section 18A to generate an enhanced voice waveform, to finally output a voice which is corrected through the speech outputting section 20A based on the enhanced voice waveform. Described below with reference to FIGS. 13 and 14 is a procedure for extracting a voice component from a speech signal waveform through the convex-concave converting section 14A and the speech component extracting section 16A. FIGS. 13 and 14 respectively show an acquired speech signal waveform. FIG. 13 shows a waveform corresponding to the lowest frequency of the voice, with its pitch being $T_1$. FIG. 14, on the other hand, shows a waveform corresponding to the highest frequency of the voice, with its pitch being $T_2$. In a frequency component contained in a human voice, the lowest frequency $f_1 (=1/T_1)$ is normally up to 100 Hz at the most in the case of a male speaker, while a frequency component with less than 100 Hz is almost none. In this instance, the pitch period $T_1$ is $1/100$ Hz=0.01 seconds=10 ms. The positive and negative half pitches are one-half times such figure, namely 10 ms/2=5 ms. Therefore, the sampling rate is selected to be about 5 ms (0.005 seconds), so that the sampling can be performed also in correspondence with the pitch period $T_1$ with the lowest voice. In the present embodiment, the sampling rate is selected at 6 ms, taking into consideration an allowance in the case that the frequency is in the vicinity of 100 Hz. In other words, a component with a half wave which is longer than 6 ms can be distinctly classified as a component other than a human voice, whereby a component equivalent to a low-frequency voice of a human can be extracted from the speech signal.

For example, when sampling with a sound quality equivalent to a musical CD, f=44.1 kHz is required, that is, 44,100 samples are acquired per second. When sampling with this pitch, the number of samples to be acquired in a region of 0.6 ms is 44,100 samples×0.006 ms=264.6 samples. Therefore, when sampling in accordance with the above-mentioned technique, it goes well with setting to be N=264.6. Here, as described above, when N is set to be a power of two, an arithmetic operation can be performed with a bit shift, to be processed at a high speed and with a low load, based on an integer operation without employing a floating-point operation. Here, when $N=2^n$, $N=2^8=256$ will make it possible to realize a setting which is substantially equal to the above. In this case, n=8 is employed. As can be seen from the above, by employing n=8 in the case of a low tone, it is possible to correspond to sampling with a lower frequency, i.e., to acquisition of a speech signal.

Likewise, any one from n=1, 2, 3 can be employed for a high frequency of $f_2(=1/T_2)$. With this setting, a frequency component which is even higher than a high frequency component of a human voice can be distinctly classified as a noise which is not a human voice. Since an ultra-high frequency sound and an extremely low frequency tone are not contained in a human voice, they are eliminated so as to record a human voice only. In this example, a speech signal is classified into a high-frequency signal corresponding to n=1.2, 3, a middle-frequency signal corresponding to n=5 or 6, and a low-frequency signal corresponding to n=8. These values of n are determined depending on such as an environment of speech-signal acquisition and speaker's acoustic characteristics.

As described above, by varying n value in three of the high, middle and low regions for the acquired speech signal, it is possible to extract a high-frequency signal, middle-frequency signal and low-frequency signal respectively as a speech signal containing a human voice. In other words, only a component equivalent to a human voice can be extracted by varying n value at the time of sampling. In the above-mentioned processing, an extremely low and high tones are eliminated from the recorded speech signal so as to extract a human voice only. The digital pattern thus obtained contains a human voice component, so that the pattern will be subjected to correction to gain articulation.

Example 3

Cellular Phone Equipped with Deaf-Aid Function

It is possible to incorporate a deaf-aid function into mobile digital equipment such as a cellular phone. Such a cellular phone equipped with a deaf-aid function can be used as a hearing aid, for example, by switching an operating mode in a cellular phone. Thus, since the phone can be used as a hearing aid in the same posture as when using a cellular phone, that is, in a state of placing a phone receiver to an ear, little uncomfortable feeling is felt while in use, so that neighboring persons may not be easily aware that a hearing aid is being used there and then, which will serve to mitigate a sense of resistance while in use. Especially in recent years, a cellular phone has gained such widespread use that the use of a cellular phone has been established as a usual behavior pattern regardless of age or sex, so that the neighboring persons will not reveal any particular reaction to an act of placing a cellular phone to an ear, taking it as a matter of ordinary act. On the other hand, when a hearing aid with a special shape is taken out to be placed to an ear, the scene may usually be haunted by unnaturalness, so that a natural conversation may probably be hampered, due to some change in a manner of speaking, which is likely to drive both a hearing aid user and neighboring persons into a special mental state. In view of such a situation, incorporation of a hearing aid into a cellular phone will help a hearing aid user out of a psychological strain to some extent, because a cellular phone can be placed to the ear without the use of the phone as a hearing aid being realized in appearance; such a scene will become quite familiar in a daily life.

Integration of a hearing aid to a cellular phone will lead to many advantages. For example, since a loudspeaker in a cellular phone can be utilized in common with a loudspeaker in a hearing aid, an aural speaker exclusive for the hearing aid need not be carried around. Also, as the hearing aid can always be carried like when carrying a cellular phone, the user will have little sense of intentionally carrying a hearing aid, which will reduce the user's sense of resistance to using a hearing aid. Further, while not in use, the user does not have to wear it all the time, which will reduce the user's physical strain. A total cost will be curtailed when compared with preparing each of a hearing aid and a cellular phone, because an integrated circuit for a deaf-aid function can be incorporated into an integrated circuit for a digital processing in a cellular phone, without a need for fabricating a separate integrated circuit exclusive for a hearing aid. Further, in recent years, a rechargeable type of battery for a cellular phone has been developed which can be used for an extended period of time, so that the use of such an up-to-date battery will ease a hearing aid user out of his or her worry about an electric power shortage. Even additionally, aside from the battery, a main body can be fabricated on the basis of an up-to-date cellular phone as well, so that it is possible to employ a latest model of cellular phone in terms of function and design, which will provide for a higher convenience and a lower cost of fabrication. In particular, a cost will be high if an exclusive mold is to be prepared for fabrication of a hearing aid, but a compatibility with a cellular phone will save such a molding cost to a large extent.

In this instance, it will be desirable that the cellular phone be equipped with two or more sound collectors such as a microphone, which will be used for the user's communication over the phone and for the surrounding sounds to be collected.

Furthermore, in addition to processing a speech signal to be audible on a reproduction side like for a deaf-aid function, it is also possible to similarly process on the side of inputting a speech signal. For example, in a cellular phone, when the present invention is applied to a microphone side as well as a loudspeaker side so that the above-mentioned consonant enhancement is executed for a speech signal which is transmitted to a recipient over the phone, it is also possible to make a talking content easily caught by the other party as well as the user of the cellular phone. Furthermore, in addition to application to a phone, the invention can also be applied to equipment for reproducing a speech through a loudspeaker or an earphone in such as a TV set, radio receiver, videophone, and video conference.

Example 4

Reproduction of Foreign Language

Furthermore, the present invention can also be applied to pronouncing and catching words of a foreign language like in an English conversation. For example, in the case of English language, words can be made audible by enhancing the top and bottom in the quantized waveform. Thus, the invention may be applied to a communication system such as a microphone and loudspeaker to be used in a simultaneous interpretation, and playback equipment such as a recording tape, CD and DVD to be used as foreign language teaching materials, so that a pronunciation of foreign language can be processed for audibility.

Thus, when the algorithm in accordance with the present invention is applied, the feature in a speech signal can be extracted at a high speed, so that the speech signal can be processed within a practical computation time. As a result, a high sound quality can be realized for the speech recognition, a hearing aid with a high sound quality, and a CD containing a large volume of speech data.

Example 5

Digital Filter Circuit

The present invention, without being limited to processing a speech signal as described above, can be applied to other analog signals. That is to say, a handling with such as Digital Signal Processor (DSP) can be made easier by a kind of digitization in which an analog waveform is converted to the selected data points. For example, the digital filtering method in accordance with an embodiment of the present invention can be applied to a digital filter circuit. The digital filter circuit is such a circuit as performs an arithmetic operation of values by means of a digital signal processing circuit, through digitizing with an A/D converter at sampling points rather than by means of an analog device, for conversion of a continuous amount to be given as a time function. The present invention can be applied to a digital filtering algorithm of either an amount to be given as a function of a 2-dimensional spatial coordinate such as an image data, or an amount to be given as a function of both a spatial coordinate and temporal coordinate such as a seismic wave and a radio-frequency electromagnetic wave. Especially in accordance with Example 5, a digital filter circuit without a phase shift can be developed.

Example 6

Example of Application to Loudspeaker

Next, with reference to FIGS. 15 through 21, Example 6 will be described in which a digital filtering in accordance with the present invention is applied to a loudspeaker.

An audio frequency ranges roughly from 20 Hz to 20 kHz, and so a sound cannot be well reproduced over a full frequency band with a single piece of loudspeaker. Therefore, in a practical usage, a plurality of loudspeakers are used to reproduce the entire audio-frequency sound. This is referred to as a multi-channel loudspeaker system, in which a speaker exclusive for a low tone is referred to as a woofer, a speaker exclusive for a middle tone is referred to as a squawker, and a speaker exclusive for a high tone is referred to as a tweeter. A loudspeaker system is referred to as a three-channel system in which three loudspeakers of woofer, squawker and tweeter are used. Likewise, a loudspeaker system is referred to as a two-channel system in which two kinds of loudspeakers are used, while a loudspeaker system is referred to as a four-channel system in which four kinds of loudspeakers are used.

Here, a two-channel loudspeaker system will be considered for brevity of explanation. In the two-channel loudspeaker system, a loudspeaker exclusive for a high tone and a loudspeaker exclusive for a low tone are used. On the other hand, in the case of an ordinary type of amplifier, it is possible to output a sound signal with an almost flat characteristic over a full range of audio frequency band. Therefore, in order for an output signal from an amplifier to be fed out to a loudspeaker exclusive for a high tone and a loudspeaker exclusive for a low tone, the sound signal must be divided into a high frequency band and a low frequency band. A filtering technology is applied in order to divide the sound based on the frequency range. There is a network filter incorporated in an ordinary type of multi-channel speaker box. Being divided into a high frequency band signal and a low frequency band signal by the network filter, the high tone signal is fed out to a loudspeaker exclusive for a high tone and the low tone signal is fed out to a loudspeaker exclusive for a low tone, and then the sound wave is synthesized in the space. A network filter in a conventional loudspeaker system is composed of a coil (L), a condenser or capacitor (C) and a resistor (R).

Illustrated in FIG. 15 is a low tone pass filter circuit composed of a coil (L) and a resistor (R). The circuit diagram is shown in FIG. 15 containing the coil L and the resistor R, and its frequency characteristic is shown in FIG. 16. When a frequency of input signal varies, the amplitude of the output signal decreases and a phase shift occurs simultaneously. FIG. 16(a) indicates a phenomenon that the amplitude is attenuated in the high-frequency range. A frequency $f_T$ in which the amplitude is lowered to about 70% is referred to as a cut-off frequency. FIG. 16(b) shows a phenomenon that the phase is shifted in the high-frequency range. When a frequency becomes sufficiently high, a phase of output signal is 90 degrees lagged from the input signal. There occurs a phase lag by 45 degrees in the cut-off frequency $f_T$. In a music signal containing a plurality of frequency components, the phase lag is dependent on a frequency, so that a waveform having passed through the filter generates a phase distortion. The generated phase distortion resulting from passing through the L-R filter cannot be retrieved nor restored to its original state, so that such a filter is referred to as an irreversible filter.

Instead of a conventional network filter, channel division equipment is developed to drive a plurality of loudspeakers in the multi-channel speaker system. In the two-channel speaker system as shown in FIG. 16(a), the loudspeakers exclusive for a low tone and for a high tone are used. A conventional analog filter is found to be unsuitable as a filter for a tone signal containing a plurality of frequencies, because a generated phase distortion is dependent on the frequency as shown in FIG. 16(b). A phase compensation circuit must be also added, which problematically results in complexity and a higher cost.

Meanwhile, in a non-phase shift filter applying a low pass filtering and high pass filtering to which the present invention is applied, an attenuation may occur in an amplitude but no change can be seen in a phase, so that an ideal filter can be developed for audio usage.

When the L-R circuit shown in FIG. 15 is applied, a high frequency component of signal is eliminated so as to be inputted into the loudspeaker exclusive for a low tone. Since the loudspeaker exclusive for a low tone has a heavy cone, it cannot move freely. Therefore, a high-frequency tone outputted from the loudspeaker results in a disagreeable sound quality. If the high-frequency tone is attenuated, the low-frequency tone only is inputted into the loudspeaker exclusive for a low tone. On the other hand, a C-R circuit shown in FIG. 17 is used to constitute the high-frequency tone pass filter, so that its output is inputted into the loudspeaker exclusive for the high-frequency tone. FIG. 18 shows a frequency characteristic of the C-R filter. An amplitude characteristic of signal as shown in FIG. 18(a) indicates that the high-frequency tone passes through the C-R filter. A phase characteristic shown in FIG. 18(b) indicates that a phase lead in the low-frequency band is about 90 degrees, however, no phase shift is caused in the high-frequency band. The low-frequency components of input signal has been attenuated, so that even when the output from this filter is inputted into a loudspeaker exclusive for a high tone, the loudspeaker is not likely to break down.

The L-R circuit shown in FIG. 15 is also referred to as an analog integrating circuit, while the C-R circuit shown in FIG. 17 is also referred to as an analog differentiating circuit. In analog differentiating/integrating circuits, a characteristic can be obtained in which the amplitude of signal attenuates depending on the frequency, but there is a disadvantage that the phase difference between the input and output is generated depending on the signal frequency. A channel divider may be used as a method for dividing a signal based on the frequency, however, this method cannot be free from a frequency dependence of the phase shift.

Meanwhile, in a filter where the digital differentiation/integration processing is applied, the amplitude of signal attenuates depending on a frequency but the phase shift depending on frequency change is not caused in the proposed filtering algorithm, so that the filter can exhibit an excellent characteristic for audio usage.

A network filter used in a two-channel loudspeaker system is shown in FIG. 19. As shown in this Figure, an output signal from the C-R circuit is inputted into the loudspeaker exclusive for a high tone, while an output from the L-R circuit is inputted into the loudspeaker exclusive for a low tone. Thus, while being divided into a low tone and a high tone, the amplitude of signal can be tuned to become almost flat (planar) as an overall frequency characteristic. However, a phase distortion cannot be restored which results from the phase lag and lead. As such, there occurs a phase distortion in a network filter used in the conventional type of loudspeaker systems. That is to say, the network filter to which the analog differentiating/integrating circuits are applied is irreversible; as far as this network filter is employed, a deterioration in sound quality cannot be avoided which results from a transient phenomenon and phase distortion.

In the meantime, the non-phase-shift filter in accordance with an embodiment of the present invention is a reversible filter and does not create a transient phenomenon; when this filter is applied, there is almost none of factors which might deteriorate a sound quality.

The above-mentioned reversibility and irreversibility will be discussed below in detail. Shown in FIG. 20 is a summation of the outputs from the high tone pass filter using the C-R circuit and the low tone pass filter using the L-R circuit. An arithmetic operation for summation is a simple summation of the output from the high tone pass filter and the output from the low tone pass filter, whose summation result can be obtained by using an analog adder but can also be obtained through a digital, simple summation. The summation result coming out of the above analog filter is different from the original input signal, which is caused by a phase difference occurring in passing through the filter and also by a transient phenomenon. Therefore, when the output waveform of the network filter used in a conventional type of loudspeaker system is summed and compared with the original input waveform, they are mutually different and irreversible. This can be one of the causes for a deteriorated sound quality in a loudspeaker system.

Next, with reference to FIG. 21, a reversibility will be verified of the filter for non-phase shift in accordance with Example 6 of the present invention. The output signal from the high tone pass section employing the high pass filtering, as shown in the Figure, is fed out to the loudspeaker exclusive for a high tone, and the output signal from the low tone pass section employing the low pass filtering is fed out to the loudspeaker exclusive for a low tone, in order to constitute a multi-channel loudspeaker system. To verify the reversibility, a summation is obtained of the output from the high pass filtering and the output from the low pass filtering. An arithmetic operation for the summation is a simple summation of the output from the high pass filtering and the output from the low pass filtering, whose summation result can be obtained by using an analog adder but can also be obtained through a digital, simple summation. Since the above summation result completely coincides with the original input signal, a reversibility is assured. That is to say, the tone signal is divided into a low frequency component and a high frequency component, without having a phase distortion and a transient phenomenon, so that a synthesis of the divided signals completely coincides with the signal prior to being divided. In audio equipment, such reversibility is extremely important in terms of a sound reproducibility. In FIG. 21, however, the high pass filtering is equivalent to a subtraction value, while the low pass filtering is equivalent to a division value.

In a multi-channel loudspeaker system, a high-frequency pass filter is composed by using the high pass filtering in accordance with the present invention and a low-frequency pass filter is composed by using the low pass filtering in accordance with the present invention, so that a network filter is constituted; all the factors causing a deteriorated sound quality can be avoided which are possessed by an analog filter, so that a sound quality is enjoyable to listen.

Example 7

Example of Application to Electroencephalography

Next, with reference to FIG. 22, Example 7 will be described in which the inventive digital filtering is applied to an electroencephalography. FIG. 22 shows a spectral waveform of a brain wave extracted from a frontal lobe of the head. In this Figure, the curve depicted by thin line is a spectrum obtained through the Fourier transform without adding any treatment to the extracted brain wave. It should be noted, however, that while a 60-Hz hum filter was put into effect using a twin-T bridge filter when the brain wave is extracted, there are noises incorporated, which are 60 Hz as an electromagnetic wave coming from the power source as well as 120 Hz and 180 Hz being its harmonic components. When a digital filtering is effected, with N=16, to the source signal of the brain wave to obtain a digital integration, a spectrum is obtained as depicted by thick line in FIG. 22. Further, when a high pass filtering is effected to the source signal of the brain wave, a spectrum is obtained as depicted by dotted line in FIG. 22. In this Figure, removed completely from the spectrum of the digital integration depicted by thick line is a noise coming from the power source, and even an a wave is distinctly detected which is present in the vicinity of 10 Hz.

In the case that a conventional filtering method is applied to an electroencephalograph (EEG) processing, the important feature of EEGs related with the phase shift is lost because the EEG contains many frequency components. Meanwhile, when the digital filtering in accordance with Example 7 is put into effect, the phase can be completely maintained and, in addition, a hum noise from the power source can be completely removed, so that it becomes possible to extract a signal very well for treatment. When drawing a brain electrical activity mapping by using a plurality of electrodes, it is necessary to retain the phases of a plurality of electroencephalograph signals to remove a noise; thus, the digital filtering technology is optimally applied, while conventional analog and digital filters are not suited for such a purpose. As such, the digital filtering method is optimally used for removal of a noise which will be incorporated when measuring a biomedical signal such as a brain wave, an electrocardiographic complex and an electromyographic complex. Thus, when the digital filtering is applied for a filter of biometric instruments such as an electrocardiograph, an electroencephalograph and an electromyograph, the filter properties of its non-phase shift are utilized in an effective manner.

Example 8

Reception of Electromagnetic Wave

Further, with reference to FIGS. 23 and 24, Example 8 will be described in which the digital filtering in accordance with the present invention is applied to reception of an electromagnetic wave. FIG. 23 shows a signal waveform which is subjected to an A/D conversion by transmitting an electromagnetic wave in the frequency band of 2.4 GHz and receiving its reflected wave via an antenna. In equipment such as for CT (Computerized Tomography) to be used for measuring a vibrational state of an object by using a signal waveform, removal of a noise is an essential process required to improve a quality of CT images. A filter is typically used for a noise removal, but its frequency becomes so high that it is difficult to set an appropriate parameter of filter when the measured signal is variant.

Meanwhile, when a digital filtering is effected to the signal waveform of the electromagnetic wave shown in FIG. 23 to perform a digital integration, there appears a waveform as depicted in FIG. 24. As shown in this Figure, a noise component contained in FIG. 23 is completely removed through the digital filtering. In addition, when the waveform in FIG. 23 is strictly compared with the waveform in FIG. 24, it can be seen that no difference in both phases is present at all. When a conventional analog filter and digital filter are put into effect, the waveforms are always accompanied by a change in phase of signal, which tends to cause an error in subsequent processing. On the other hand, when the digital filtering in accordance with Example 8 is put into effect, it is possible to completely remove a noise component without being accompanied by a change in phase, proving its effectiveness. Especially, in measurement such as CT and MRI in which an RF (Radio Frequency) signal is used for measurement, when a digital filtering is put into effect which has a non-phase shift characteristic, the filtering properties are proven to be good, without causing any phase error in the subsequent signal processing. Indeed, it can be concluded that the digital filtering is an extremely effective technique.

INDUSTRIAL APPLICABILITY

The inventive digital filtering method, digital filtering equipment, digital filtering program, and recording medium and recorded device which are readable on a computer can suitably be applied to a pre-processing and post-processing of a speech signal such as a speech recognition, which can be applied to mobile digital equipment including a cellular phone, for example, as a personally adaptive type of speech recognition system. Also, without being limited to a speech signal alone, a high-quality, low-loaded signal processing can be realized for an improved reproducibility of a loudspeaker, electroencephalography, and reception of an electric wave.

BRIEF DESCRIPTION OF THE DRAWINGS

FIG. 1 is a block diagram showing a configuration of an electron-beam imaging section in the speech recognition equipment in accordance with an embodiment of the present invention;

FIG. 2 is an explanatory graph showing how a division value $\alpha_k$ is obtained based on N number of data in a quantized data;

FIG. 11 is a block diagram showing a configuration of an auditory sense assisting device in accordance with Example 2 of the present invention;

FIG. 12 is a flow chart showing a procedure in a speech signal processing method;

FIG. 16 is a graph showing a frequency characteristic of the L-R circuit in FIG. 15;

FIG. 18 is a graph showing a frequency characteristic of the C-R circuit in FIG. 17;

DENOTATION OF REFERENCE NUMERALS

Figure 3:
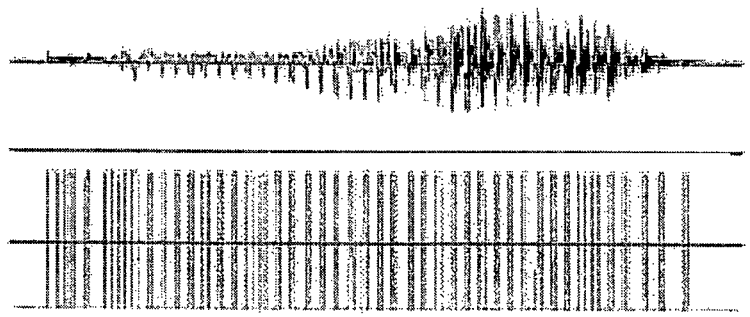
FIG. 3 is an explanatory graph showing an inputted speech waveform and its pitch information.
Figure 4:
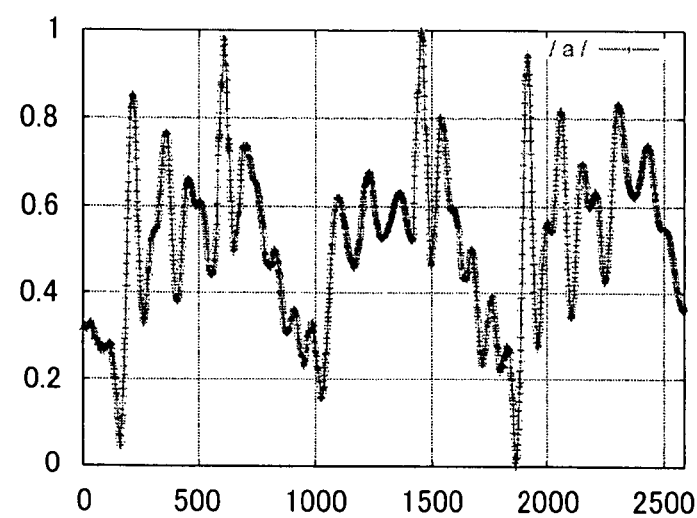
FIG. 4 is a graph showing the three pitches of steady-state vowel waveform.
Figure 5:
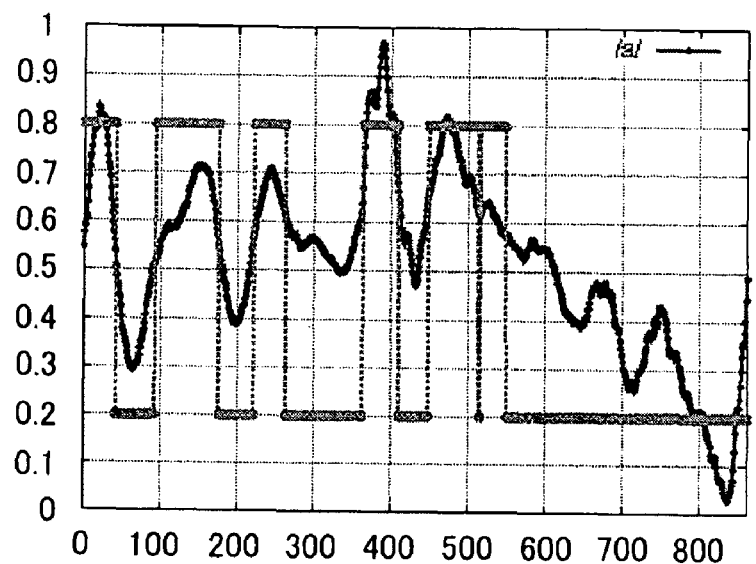
FIG. 5 is a graph showing one pitch of selected data points, with N=256, from FIG. 4.
Figure 6:
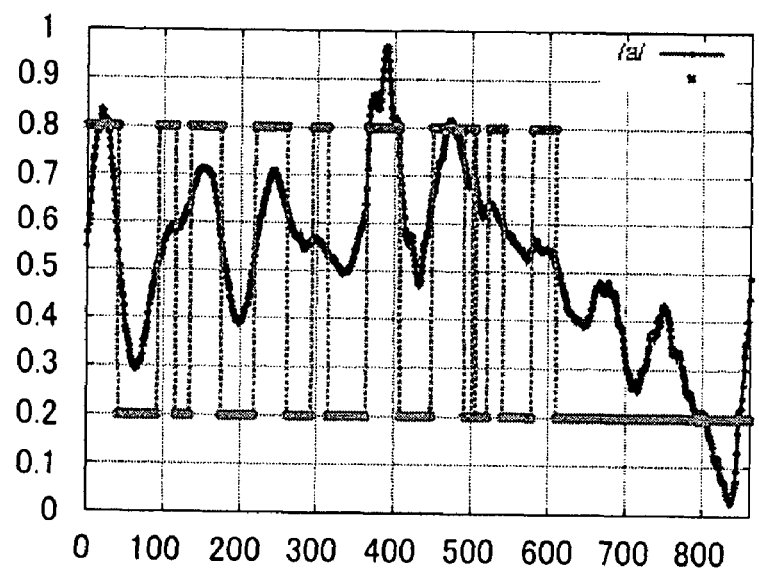
FIG. 6 is a graph showing one pitch of selected data points extracted, with N=64, from FIG. 4.
Figure 7:
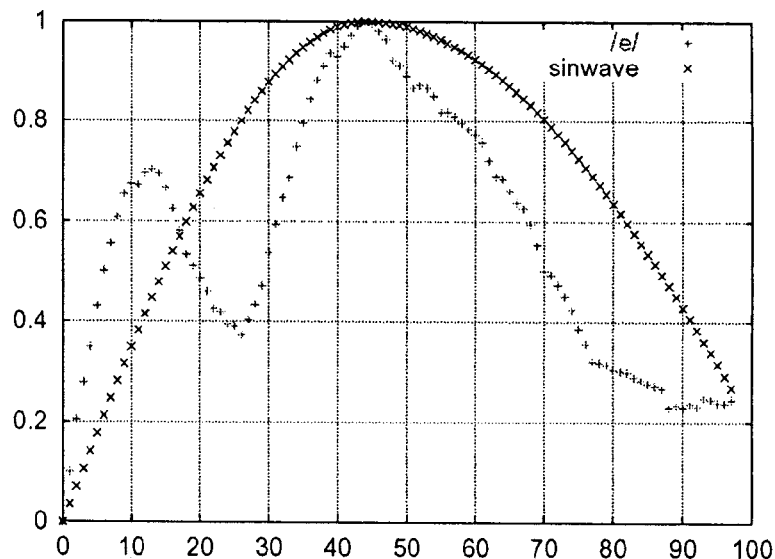
FIG. 7 is a graph showing /e/ phonemic waveform in the convexity portion and a sinusoidal waveform generated from the phonemic waveform.
Figure 8:
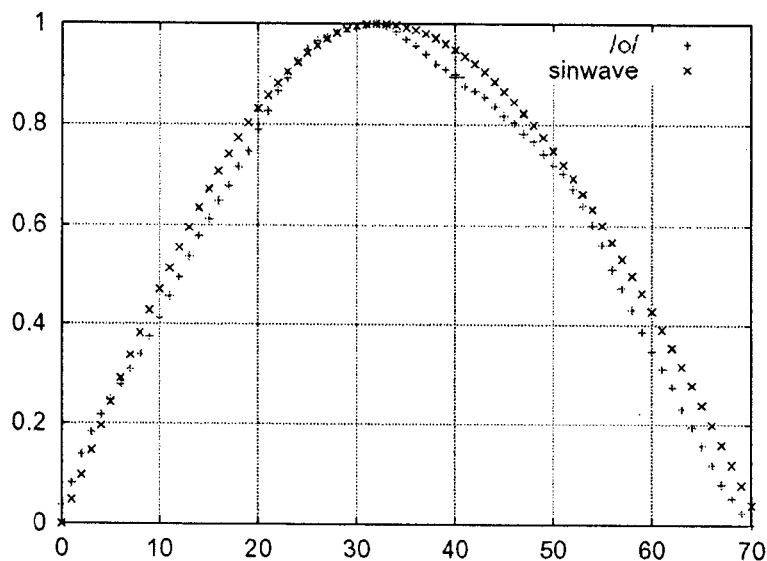
FIG. 8 is a graph showing /o/ phonemic waveform in the convexity portion and a sinusoidal waveform generated from the phonemic waveform.
Figure 9:
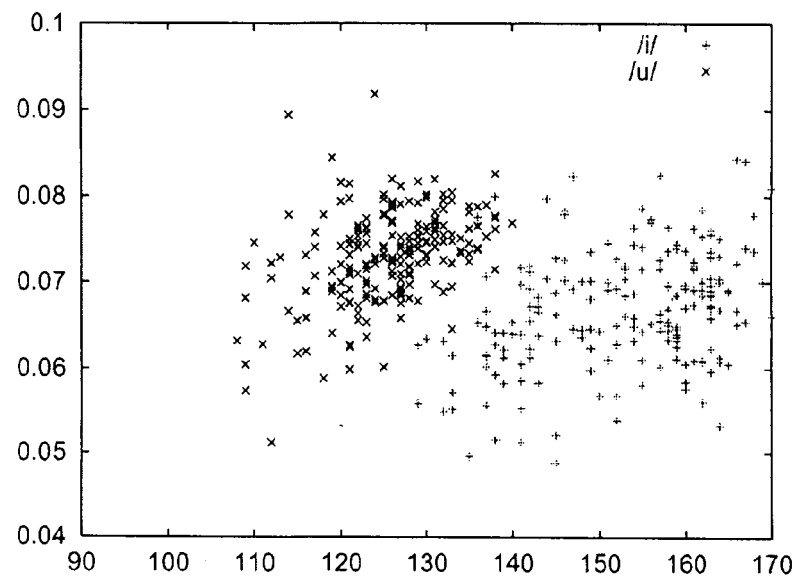
FIG. 9 is a graph showing a distribution of characteristics regarding /i/ and /u/ which are used in a conscious utterance.
Figure 10:
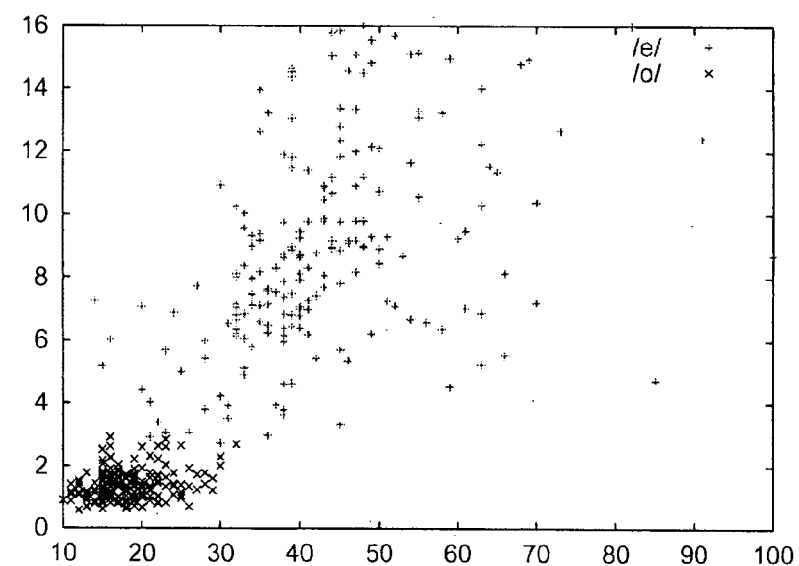
FIG. 10 is a graph showing a distribution of characteristics regarding /e/ and /o/ which are used in a conscious utterance.
Figure 13:
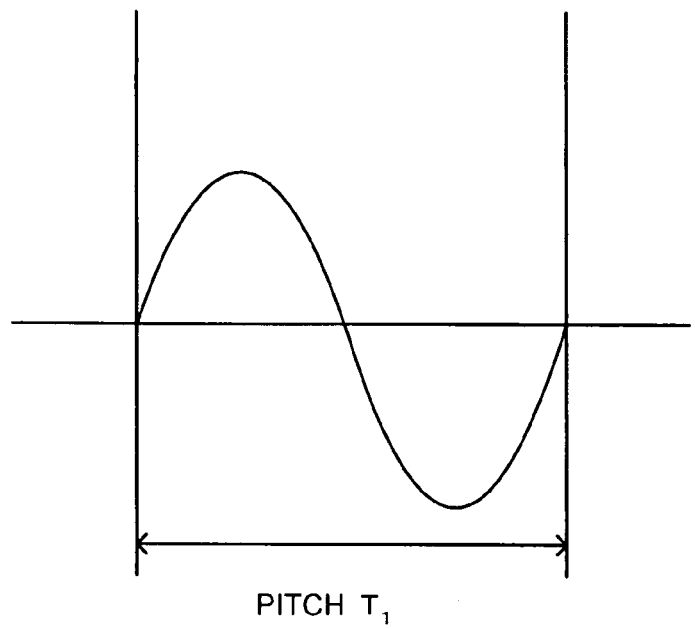
FIG. 13 is a graph showing a waveform corresponding to the lowest frequency of a speech.
Figure 14:
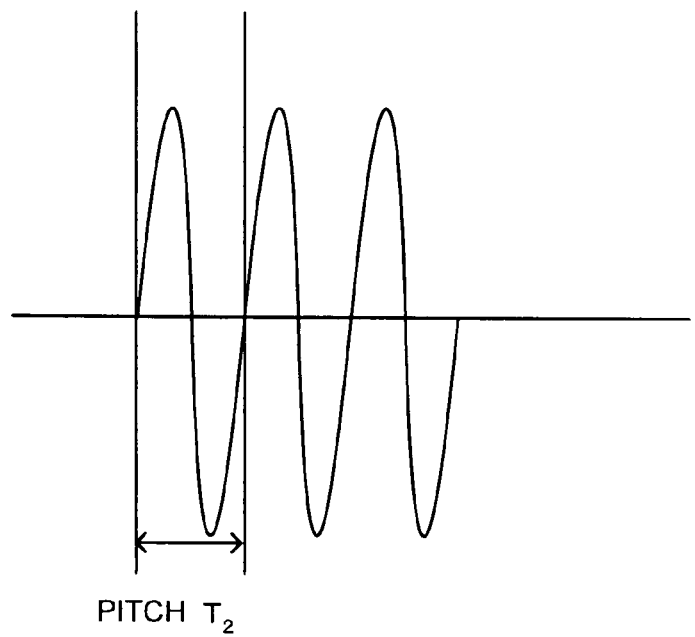
FIG. 14 is a graph showing a waveform corresponding to the highest frequency of a speech.
Figure 15:
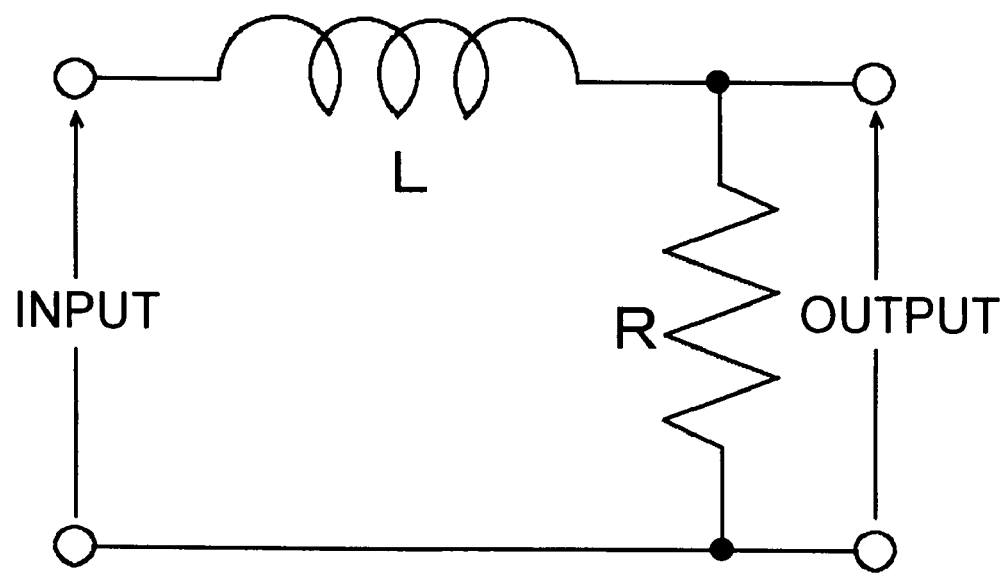
FIG. 15 is a circuit diagram showing a low tone pass filter circuit.
Figure 17:
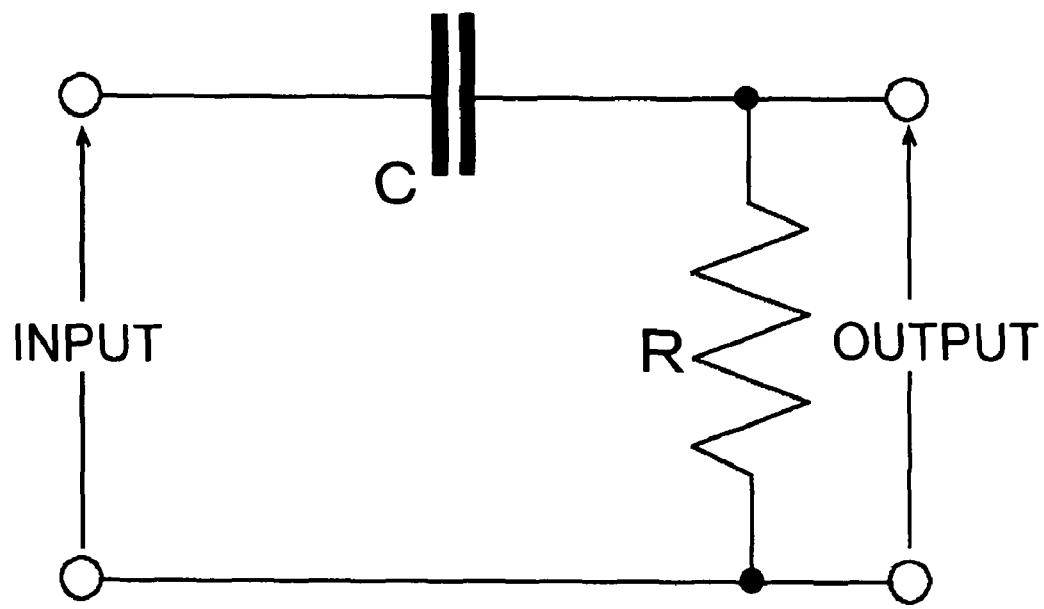
FIG. 17 is a circuit diagram showing a high tone pass filter circuit.
Figure 19:
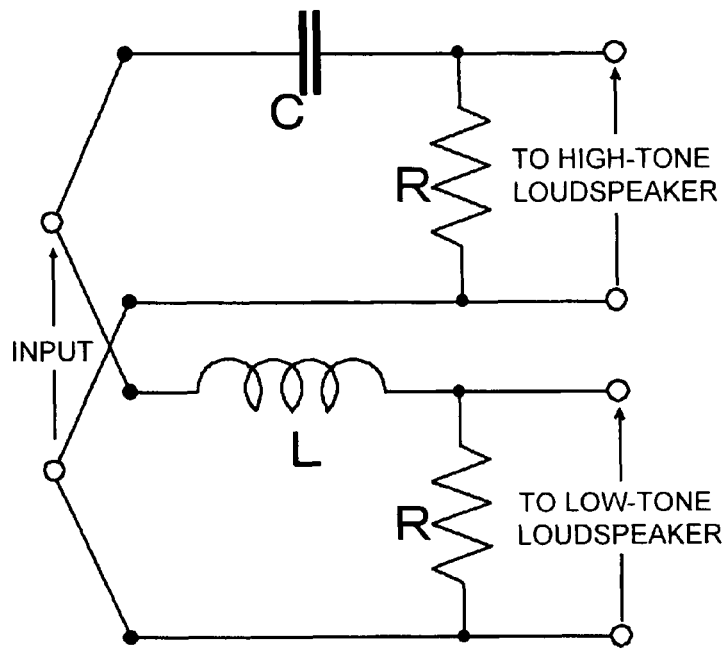
FIG. 19 is a circuit diagram showing a network filter in a two-channel loudspeaker system.
Figure 20:
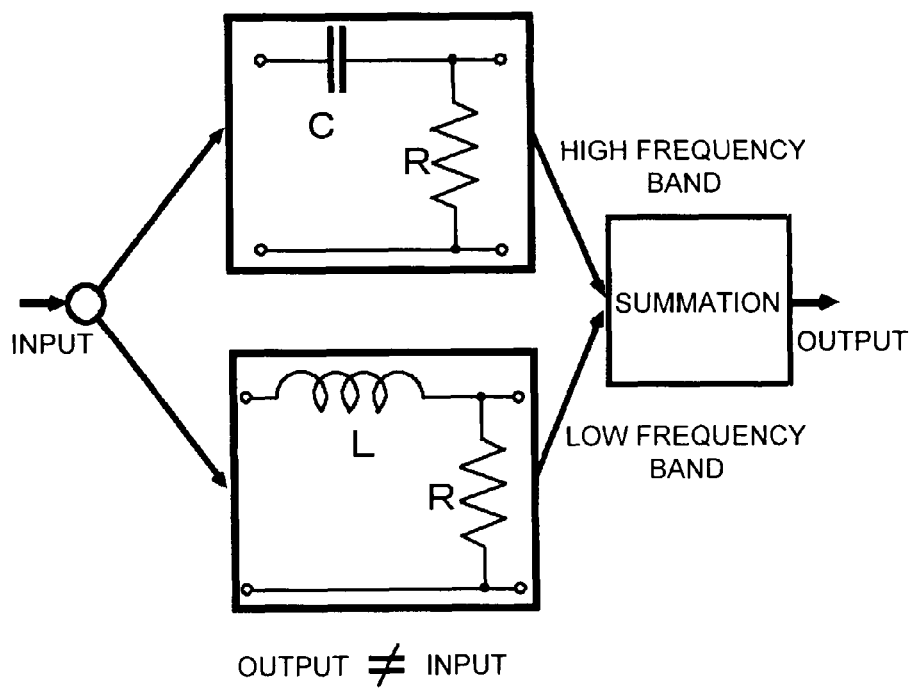
FIG. 20 is a block diagram showing a circuit in which the outputs are summed from the high tone pass filter in FIG. 17 and the low tone pass filter in FIG. 16.
Figure 21:
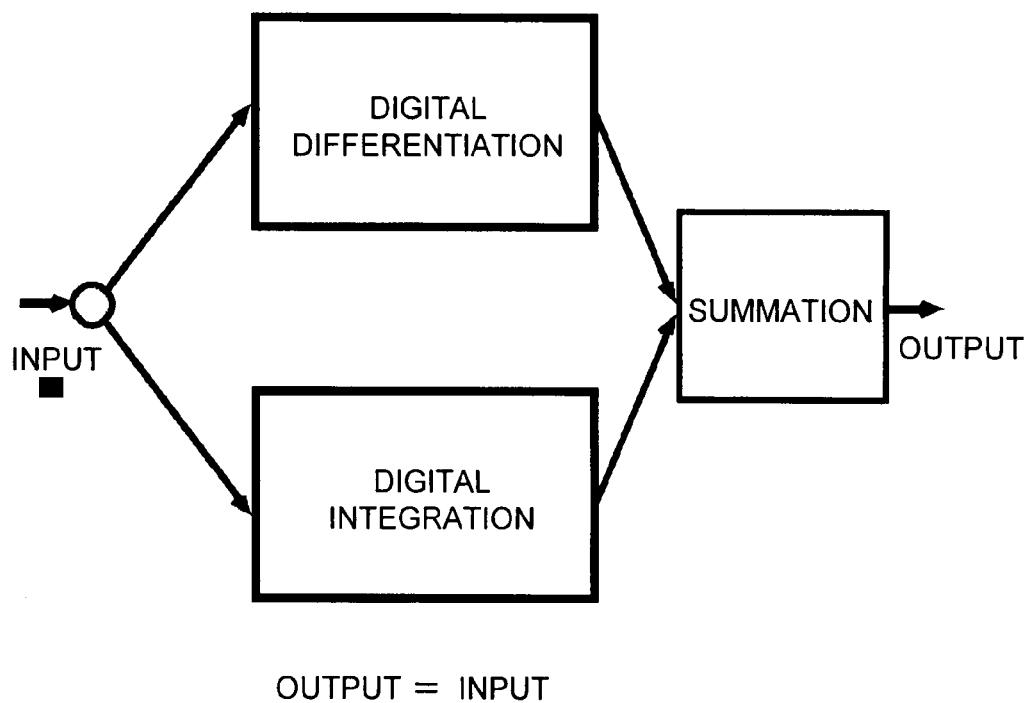
FIG. 21 is a block diagram showing a filter for a non-phase shift in accordance with an embodiment of the present invention.
Figure 22:
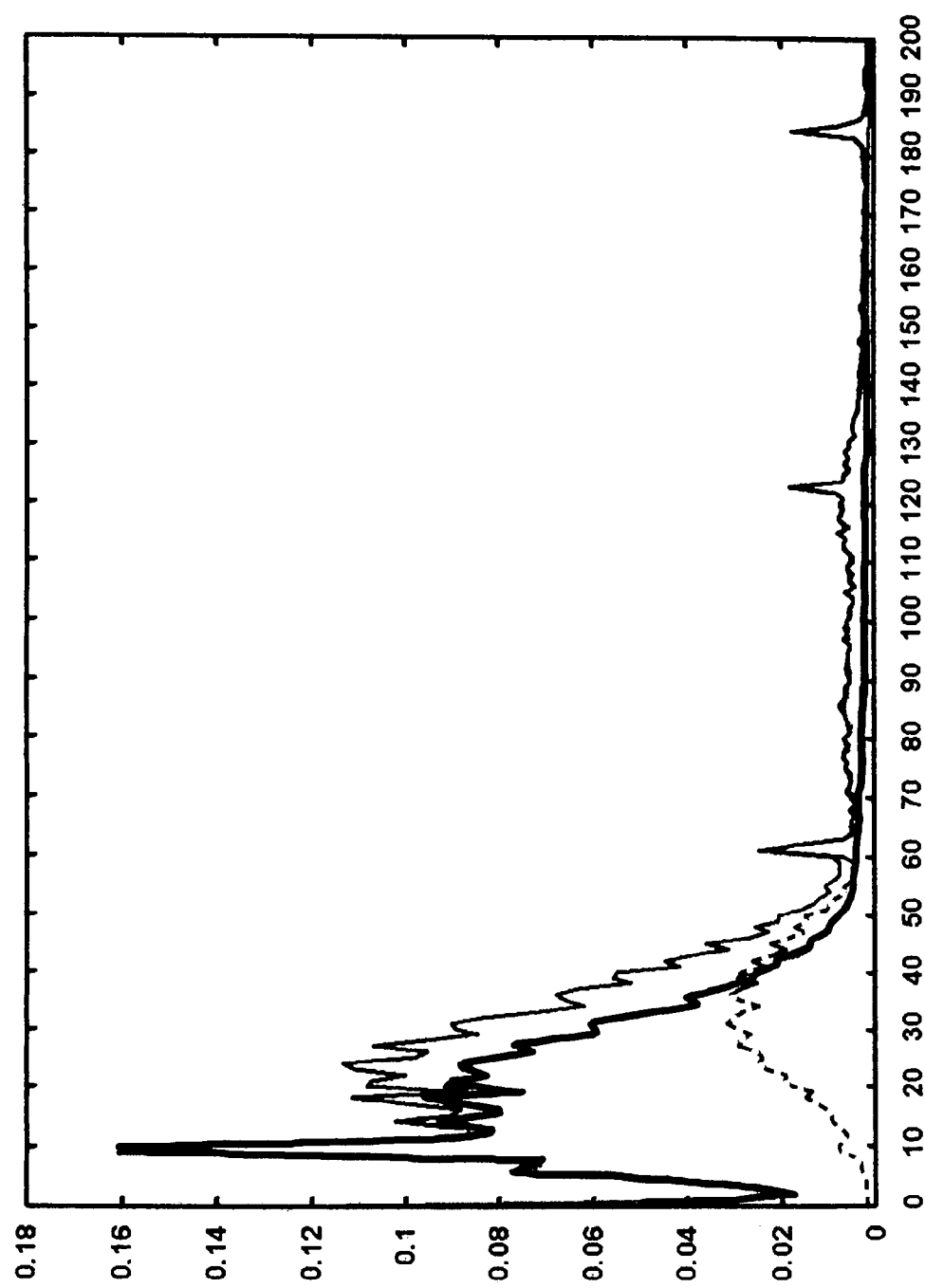
FIG. 22 is a graph showing a spectral waveform of a brain wave extracted from a frontal lobe of the head.
Figure 23:
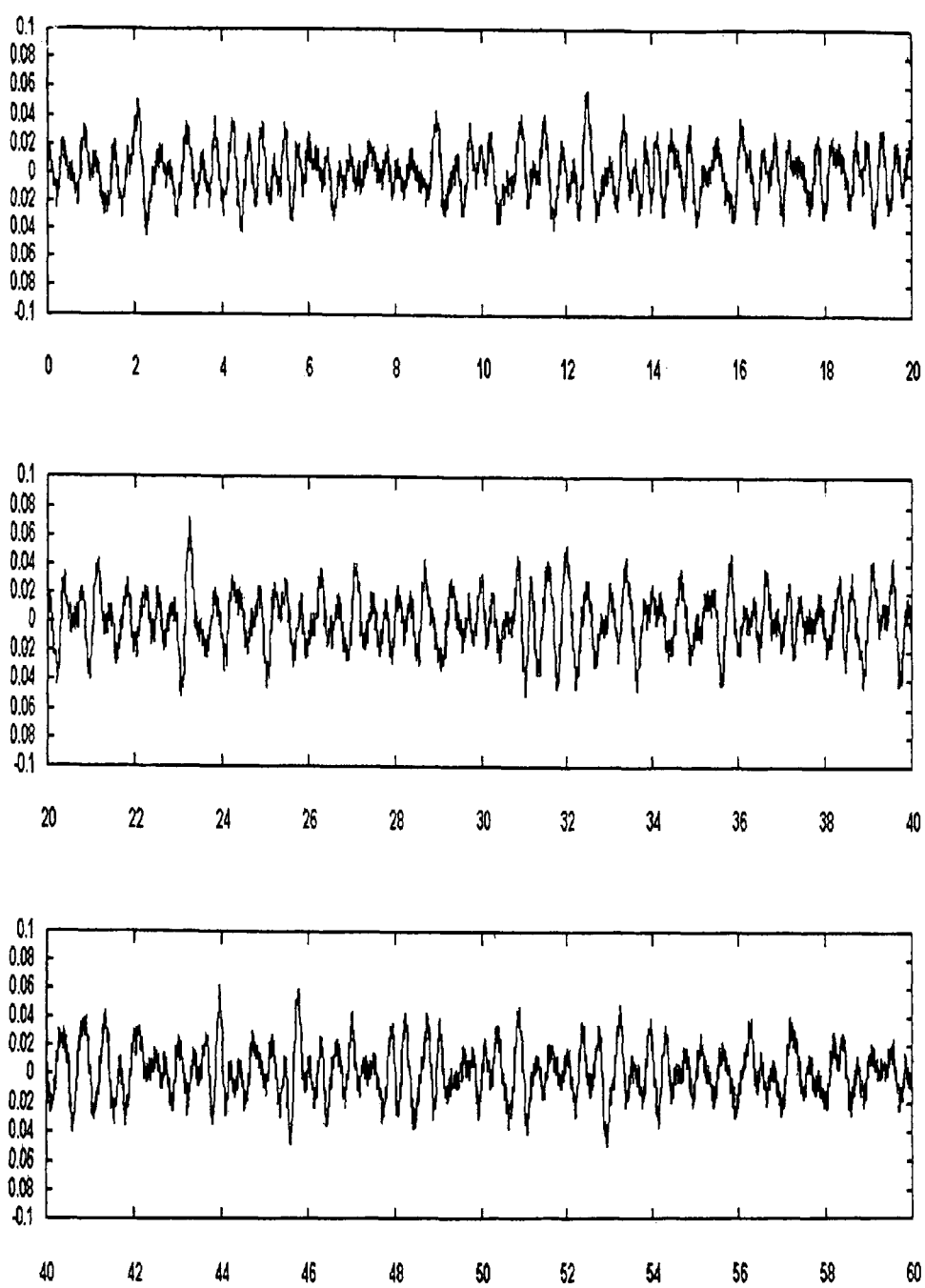
FIG. 23 is a graph showing a signal waveform which is subjected to an A/D conversion by receiving, via an antenna, a reflected wave of an electromagnetic wave in the frequency band of 2.4 GHz.
Figure 24:
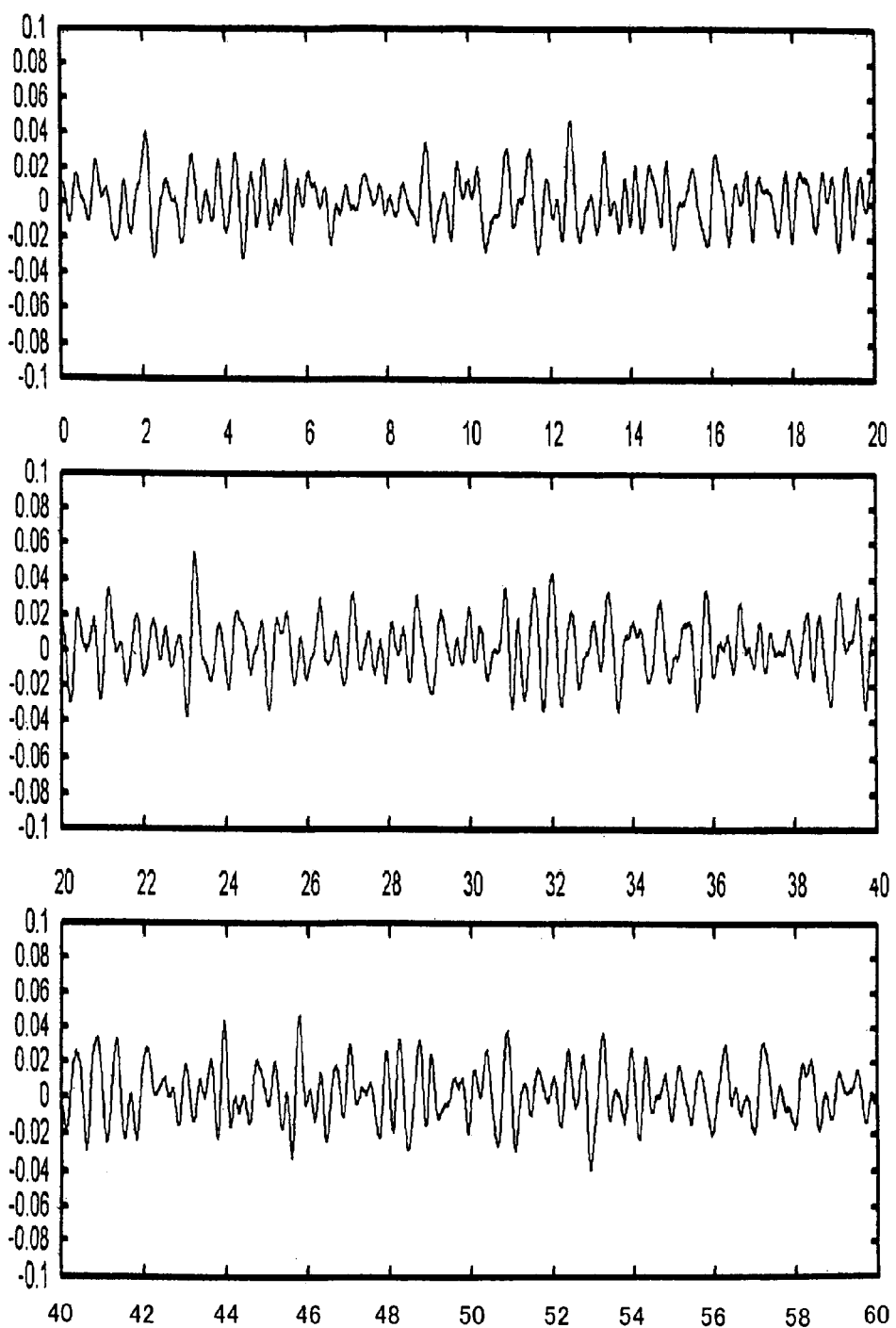
FIG. 24 is a graph showing a waveform in which a digital filtering is effected to the signal waveform of the electromagnetic wave shown in FIG. 23 to execute a digital integration.
Figure 25:
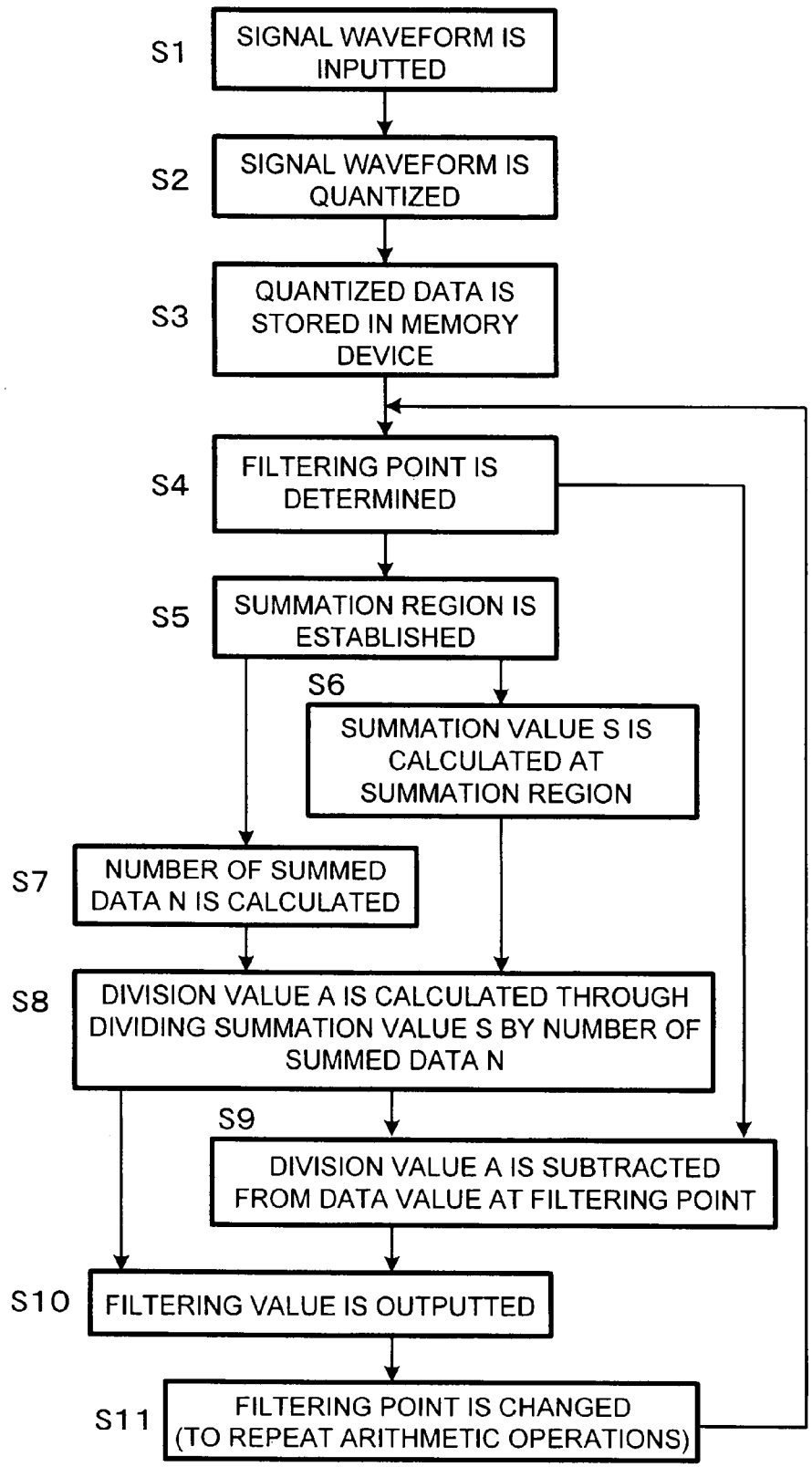
FIG. 25 is a flow chart showing a procedure in the digital filtering method in accordance with an embodiment of the present invention.

| 100 | Speech Recognition Equipment |
|---|---|
| 200 | Auditory Sense Assisting Device |
| 10 | Microphone |
| 12 | Noise Elimination Device |
| 14 | Feature Quantity Extracting Section |
| 16 | Similarity Determining Section |
| 18 | Discrimination Section |
| 20 | Standard Model Dictionary |
| 22, 22A | Amplitude Determining Section |
| 24, 24A | Division Value Operating Section |
| 26, 26A | Comparison Section |
| 28, 28A | Conversion Section |
| 10A | Speech Inputting Section |
| 12A | A/D Converter |
| 14A | Convex-Concave Converting Section |
| 16A | Speech Component Extracting Section |
| 18A | Enhancement Processing Section |
| 20A | Speech Outputting Section |

The invention claimed is:

1. A digital filtering method for extracting a feature quantity based on an inputted signal waveform, the method comprising:

a step of inputting a signal waveform as an input signal, quantizing the signal waveform to acquire a quantized data, and storing such quantized data in a storage device;

a step, in said quantized data, of pre-establishing as a summation region a prescribed region adjoining a selected point and/or pre-establishing the number of data contained in the summation region, so that i) a summation value is obtained, at each individual point in the quantized data stored in said storage device, by summing all data values in the summation region; ii) a division value is obtained by dividing said summation value by the number of data in the summation region; and iii) a difference is calculated as a subtraction value through subtraction between the data value in the quantized data at said point and said division value; whereby said division value and subtraction value are outputted; and a step of effecting a digital filtering by repeating said steps to calculate said division value and subtraction value in each individual quantized data, so that the inputted signal waveform is subjected to the digital filtering based on each division value and subtraction value which are individually outputted, the step of effecting said digital filtering comprising:

a step of effecting a high-pass filtering based on said subtraction value; and a step of effecting a low-pass filtering based on said division value wherein the number of data to be summed in the prescribed region is a power of two.

2. The digital filtering method as recited in claim 1, wherein, in said summation region, the prescribed region is set to be symmetrical with respect to a selected point.

3. The digital filtering method as recited in claim 1, wherein the step of effecting said digital filtering comprises:

a step of comparing the data value at each data point with the corresponding division value, for transformation into the selected data points based on logical truth of a comparison result.

4. The digital filtering method as recited in claim 1, wherein a summation, a subtraction and a division are performed with an integer arithmetic.

5. The digital filtering method as recited in claim 1, wherein the division by the number of data summed in the prescribed region is performed with a bit-shift operation.

6. The digital filtering method as recited in claim 1, wherein, in the step of calculating said division value, a summation value is retained which is obtained by summing the signal data value in the prescribed region in order to obtain a division value with respect to each signal data, and, in obtaining a summation value in a subsequent data, an unnecessary data value is subtracted from the retained summation value and a necessary data value is added thereto, so that a summation value is calculated.

7. The digital filtering method as recited in claim 6, wherein when a division value $\alpha_k$ in the region N ($=2n$) of anterior-posterior n, with a point k being centered, is expressed in $$\alpha_k = \frac{\left(\sum_{i=k+1}^{n+k} x_i\right) + \left(\sum_{i=k-n}^{k-1} x_i\right)}{N}, \qquad \text{Equation 1}$$

in the step of calculating a division value, the division value $\alpha_k$ is calculated with Equation 2 by using a division value $\alpha_{k-1}$ at an anterior point k−1;

$$\alpha_k = \alpha_{k-1} + (x_{k-1} + x_{n+k} - x_k - x_{k-1-n})/N. \qquad \text{Equation 2}$$

8. The digital filtering method as recited in claim 1, wherein N is the prescribed region adjoining the selected point or the number of data contained in the prescribed region, and N=64 or 256.

9. The digital filtering method as recited in claim 8, wherein, in referring to the selected data points with N=256, the feature quantity comprises a width of an initial convexity which is obtained in search from the beginning of one pitch of vowel waveform.

10. The digital filtering method as recited in claim 8, wherein, in referring to the selected data points with N=256, the feature quantity comprises a range of quantized data present in a width of an initial convexity which is obtained in search from the beginning of one pitch of vowel waveform.

11. The digital filtering method as recited in claim 8, wherein, in referring to the selected data points with N=256, the feature quantity comprises a dispersion value of quantized data present in a width of an initial convexity which is obtained in search from the beginning of one pitch of vowel waveform.

12. The digital filtering method as recited in claim 8, wherein, in referring to the selected data points with N=256, and through 0, 1 normalization of quantized data in a width of an initial convexity which is obtained in search from the beginning of one pitch of vowel waveform, the feature quantity comprises a similarity to a sinusoidal wave created in the width of the convexity.

13. The digital filtering method as recited in claim 8, wherein, with N=64, the feature quantity comprises the number of convexities present in the three pitches of selected data points.

14. The digital filtering method as recited in claim 1, wherein an inputted signal waveform comprises a tone signal.

15. The digital filtering method as recited in claim 1, wherein an inputted signal waveform comprises an electromagnetic wave.

16. The digital filtering method as recited in claim 1, wherein an inputted signal waveform comprises a biological signal.

17. The digital filtering method as recited in claim 1, wherein, said step, in said quantized data, of pre-establishing a summation region further comprising calculating a difference as a subtraction value through subtraction between the data value in the quantized data at said point and said division value; whereby said division value is outputted; and
wherein said step of effecting a digital filtering comprises repeating said steps to calculate said division value and subtraction value in each individual quantized data, so that the inputted signal waveform is subjected to the digital filtering based on each division value and subtraction value which are individually outputted.

18. The digital filtering method as recited in claim 17, wherein the step of effecting said digital filtering comprises:
a step of effecting a high-pass filtering based on said subtraction value; and
a step of effecting a low-pass filtering based on said division value.

19. Digital filtering equipment for extracting a feature quantity based on an inputted signal waveform, the equipment comprising:
an amplitude determining section for obtaining an amplitude of an inputted signal waveform and quantizing said amplitude;
a division value operating section for summing an amplitude value in a data in a prescribed adjoining region to divide the amplitude value by the number of summed data, with respect to a data quantized at each point by said amplitude determining section, so that a division value is obtained with said data being centered;
a subtraction means for obtaining a difference by subtraction between the division value calculated by said division value operating section and the amplitude value calculated by said amplitude operating section, with respect to each data;
a storage device for retaining at least one of a summation value, a subtraction value and a division value; and
a filter for effecting a low-pass filtering based on said division value obtained by said division value operating section, while effecting a high-pass filtering based on said subtraction value obtained by said subtraction means,
wherein the number of data to be summed in the prescribed region by the division value operating section is a power of two.

20. The digital filtering equipment as recited in claim 19 further comprising;
a comparison section for comparing a division value calculated by said division value operating section and an amplitude value calculated by said amplitude operating section, with respect to each data, so that logical truth of a comparison result is outputted; and
a conversion section for converting a signal waveform into the selected data points based on an output from said comparison section.

21. The digital filtering equipment as recited in claim 19, wherein, with the number of data to be summed in a prescribed region being a power of two, said division value operating section performs a division by the number of data summed in said prescribed region, on a bit-shift operation.

22. The digital filtering equipment as recited in claim 19, wherein said division value operating section retains a summation value obtained by summing an amplitude value in the data in the prescribed region in order to obtain a division value, with respect to each data, and in obtaining a summation value in a subsequent data, an unnecessary amplitude value is subtracted from the retained summation value and a necessary amplitude value is added thereto, so that a summation value is calculated.

23. The digital filtering equipment as recited in claim 19, wherein an inputted signal waveform comprises a tone signal.

24. The digital filtering equipment as recited in claim 19, wherein an inputted signal waveform comprises an electromagnetic wave.

25. The digital filtering equipment as recited in claim 19, wherein an inputted signal waveform comprises a biological signal.

26. A digital filtering program stored on a non-transitory recording medium or recorded device that is readable by a computer, said digital filtering program being for extracting a feature quantity based on an inputted signal waveform, wherein the computer is enabled by said digital filtering program to carry out:
a function of inputting a signal waveform and quantizing the signal waveform;
a function of summing the quantized signal data in a prescribed adjoining region to divide the summation value by the number of data in the prescribed region, so that a division value is obtained with said data being centered, with respect to the quantized data at each point;

a function of calculating a difference between the quantized signal data and the corresponding division value;

a function of retaining at least one of the calculated summation value, subtraction value and division value in a storage device as well as subjecting an inputted signal waveform to a digital filtering based on at least one value of the summation value, subtraction value and division value, and a function of effecting a low-pass filtering based on said division value, while effecting a high-pass filtering based on said subtraction value wherein the number of data to be summed in the prescribed region is a power of two.

* * * * *